(12) United States Patent
Pool, III et al.

(10) Patent No.: US 10,993,581 B2
(45) Date of Patent: May 4, 2021

(54) OVEN SYSTEM FOR PRESSED FOOD ITEMS

(71) Applicant: TurboChef Technologies, LLC, Carrollton, TX (US)

(72) Inventors: James K. Pool, III, Frisco, TX (US); Pete Ashcraft, McKinney, TX (US); Karl Jobst, Corinth, TX (US)

(73) Assignee: TurboChef Technologies, LLC, Carrollton, TX (US)

( * ) Notice: Subject to any disclaimer, the term of this patent is extended or adjusted under 35 U.S.C. 154(b) by 0 days.

(21) Appl. No.: 16/269,105

(22) Filed: Feb. 6, 2019

(65) Prior Publication Data

US 2019/0167036 A1 Jun. 6, 2019

Related U.S. Application Data

(63) Continuation-in-part of application No. 15/386,596, filed on Dec. 21, 2016, now abandoned.

(60) Provisional application No. 62/270,329, filed on Dec. 21, 2015.

(51) Int. Cl.
*A47J 37/06* (2006.01)
*F24C 15/16* (2006.01)
*A21B 3/13* (2006.01)

(52) U.S. Cl.
CPC .......... *A47J 37/0611* (2013.01); *A21B 3/131* (2013.01); *F24C 15/16* (2013.01); *A47J 2037/0617* (2013.01)

(58) Field of Classification Search
CPC .... F24C 15/162; F24C 15/16; A47F 37/0611; A47J 2037/0617; A21B 3/131
See application file for complete search history.

(56) References Cited

U.S. PATENT DOCUMENTS

| | | | |
|---|---|---|---|
| 1,777,529 A | 10/1930 | Neldner | |
| 1,960,365 A | 5/1934 | Barker | |
| 2,133,639 A | 10/1938 | Smith et al. | |
| 2,155,654 A | 4/1939 | Haley | |
| 3,034,420 A * | 5/1962 | Wenger | A47J 37/0623 99/392 |

(Continued)

FOREIGN PATENT DOCUMENTS

| | | |
|---|---|---|
| EP | 3394516 | 2/2020 |
| WO | 2017112764 | 6/2017 |

OTHER PUBLICATIONS

EP20155874.9, "Extended European Search Report", dated May 14, 2020, 11 pages.

(Continued)

*Primary Examiner* — Steven N Leff
(74) *Attorney, Agent, or Firm* — Kilpatrick Townsend & Stockton LLP

(57) ABSTRACT

Embodiments of the invention described herein thus provide systems and methods for creating a pressed food item in an oven cooking cavity. The oven system is secured within the oven cooking cavity and is not dependent upon oven door movement or any other oven function. A movable platen is configured to move up and down with respect to a lower platen in order to press a food item during the cooking process. The movable platen may be activated via an actuating arm that extends and is manipulated from outside the oven cooking cavity. In another example, the movable platen may be activated by motor.

12 Claims, 23 Drawing Sheets

(56) References Cited

U.S. PATENT DOCUMENTS

| | | | |
|---|---|---|---|
| 3,193,663 A | | 7/1965 | Tadeusz et al. |
| 3,884,213 A | * | 5/1975 | Smith .................... A21B 1/245 |
| | | | 126/21 A |
| 4,978,310 A | | 12/1990 | Shichida |
| 5,676,044 A | | 10/1997 | Lara, Jr. |
| 5,717,192 A | | 2/1998 | Dobie et al. |
| 5,747,775 A | | 5/1998 | Tsukamoto et al. |
| 6,114,665 A | | 9/2000 | Garcia et al. |
| 9,097,430 B2 | | 8/2015 | Stanger |
| 2004/0177770 A1 | | 9/2004 | Verveniotis |
| 2005/0174022 A1 | | 8/2005 | Kuttalek |
| 2009/0107343 A1 | | 4/2009 | De' Longhi |
| 2010/0270282 A1 | * | 10/2010 | Fernandez ................ F24C 7/06 |
| | | | 219/392 |
| 2011/0177215 A1 | | 7/2011 | Bartlett et al. |
| 2014/0285078 A1 | | 9/2014 | Armstrong et al. |
| 2015/0272387 A1 | | 10/2015 | Stanger |
| 2017/0172343 A1 | | 6/2017 | Pool, III et al. |

OTHER PUBLICATIONS

PCT/US2016/068010, "International Preliminary Report on Patentability", dated Jul. 5, 2018, 10 pages.

PCT/US2016/068010, "International Search Report and Written Opinion", dated Jun. 7, 2017, 17 pages.

* cited by examiner

OVEN SYSTEM FOR PRESSED FOOD ITEMS

CROSS REFERENCE TO RELATED APPLICATIONS

This application in a continuation-in-part of U.S. Ser. No. 15/386,596 filed Dec. 21, 2016 titled "Oven System for Pressed Food Items," which application claims the benefit of U.S. Provisional Application Ser. No. 62/270,329, filed Dec. 21, 2015, titled "Panini Press Oven," the entire contents of which are hereby incorporated by reference.

FIELD OF THE DISCLOSURE

Embodiments of the present disclosure relate generally to an oven system for pressed food items. The oven system is secured within an oven cooking cavity. An upper platen is configured to move up and down with respect to a lower platen in order to press a food item during the cooking process. It is also possible for the upper platen to remain in a lowered position (or in a raised/non-pressing configuration) so that the oven may be used without the pressing features described.

BACKGROUND

Panini sandwiches and other pressed food items are well known in today's marketplace. A Panini sandwich, Cuban sandwich, quesadilla, or other pressed sandwich or food item (generally referred to herein as a "pressed food item") is heated and pressed between two platens in order to compress the food item and to create grill marks. The traditional method for preparing a Panini sandwich is to place the sandwich in a Panini press machine. The machine typically consists of two hinged, ribbed, and heated platens. A sandwich is placed between the two platens and the platens are closed with respect to one another. The weight of the upper platen begins to press the food as it heats. A user may even choose to press down on the upper platen in order to compress the sandwich further. A typical sandwich may be positioned into the press machine having a sandwich height of between about 1.5 to 3 inches and will be compressed approximately 25-50%, depending upon the weight of the upper platen and the type of bread used.

Panini sandwiches and other pressed food items are an up-scale sandwich/food item that command a higher price than traditional toasted or grilled sandwiches. Given their popularity, there are many manufacturers of Panini press machines. The available machines, however, have similar problems. For example, they require several minutes to heat the sandwich. They require a thermal recovery. They do not heat the internal (center) of the sandwich consistently or adequately. In many jurisdictions, they require type 1 ventilation. They are purpose-built units and can do little more than press sandwiches. They may give off unpleasant odors. Cheese or other melt-able ingredients may ooze out sides or backs of the machines. The machines are also not long-lasting; primary customer complaints include that the platen coatings and hinge mechanisms fail. Accordingly, improvements to pressed sandwich/food item preparation are necessary.

BRIEF SUMMARY

Embodiments of the invention described herein thus provide systems and methods for creating a pressed food item in an oven cooking cavity. The oven system is secured within the oven cooking cavity and is not dependent upon oven door movement or any other oven function. An upper platen is configured to move up and down with respect to a lower platen in order to press a food item during the cooking process. The lower platen is generally secured with respect to the oven interior, whether to a jet plate, to an oven wall, or to a frame that is secured within the oven. The upper platen may move along a support system, which may be a vertical support system. In an alternate example, the upper platen may move via operation of an external handle (that is, a handle positioned outside the oven). Movement of the external handle is independently operated separately from movement (opening and closing) of the oven door. The external handle may cooperate with an actuating system configured to move one or both of the platens. In a further embodiment, movement of one or both of the platens may be accomplished via a stepped motor that can be set to specific food item/sandwich thicknesses as desired.

When the oven system is not in use to create a pressed food item, the upper platen can remain in a lowered position so that the oven may be used without the pressing features described. Alternatively, the upper platen may remain in a raised position so that only the lower platen is used to support and cook/warm the food item. The features disclosed provide the operator with cooking options.

DETAILED DESCRIPTION

Figure 1:
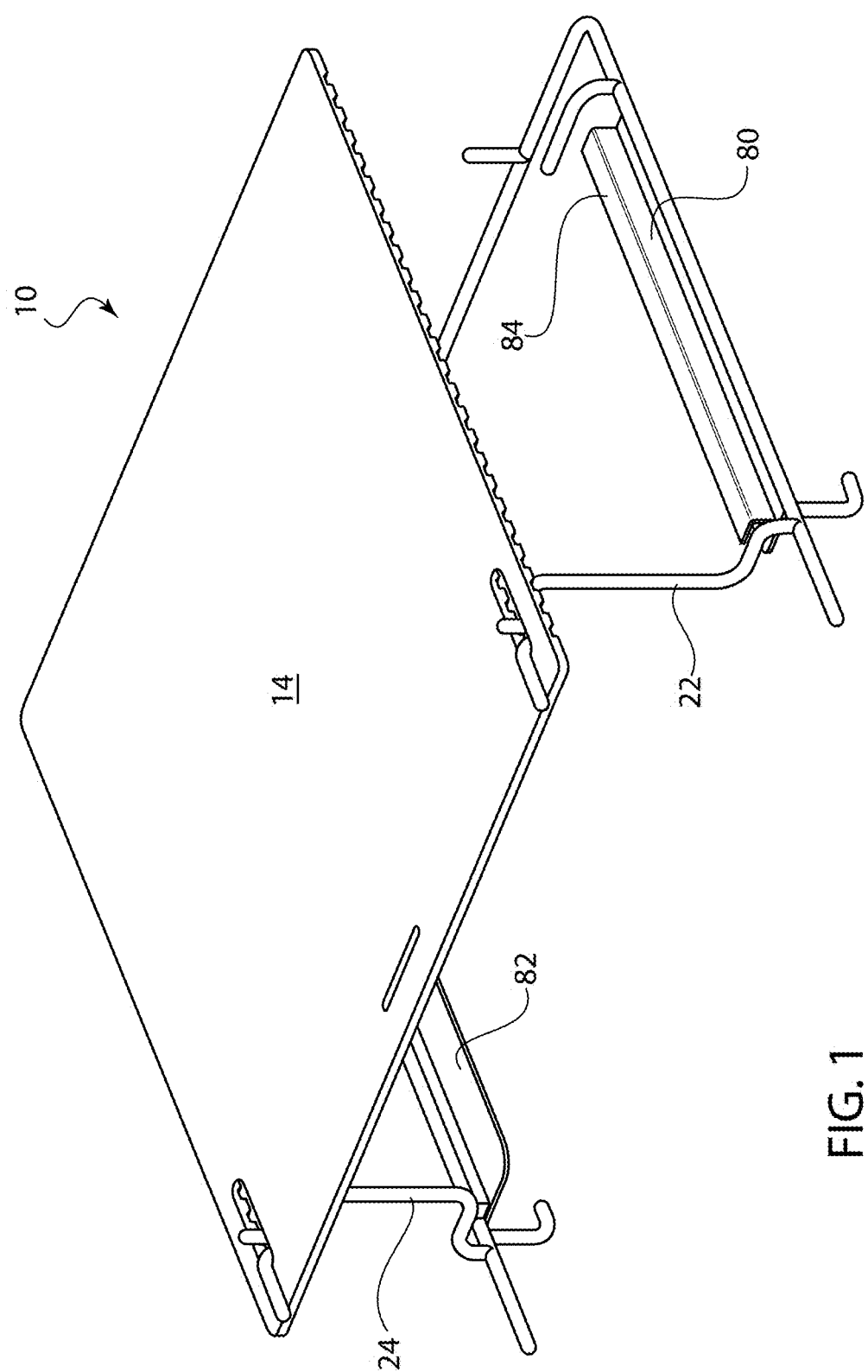
FIG. 1 shows a side perspective view of one example of an oven system frame.

Embodiments of the present invention provide an oven system for pressed food items. The system described herein may be used in connection with conventional ovens, convection ovens, toaster ovens, commercial ovens, residential ovens, or any other type of cooking device that has a cooking cavity. The oven system for pressed food items allows the pressing function of the platens to take place within a cooking cavity.

Referring now to the figures, the oven system 10 for pressed food items includes a lower platen 12, an upper platen 14, and a vertical support system 20. The lower platen 12 remains generally stationary in use, and the upper platen 14 is caused to move with respect thereto. However, it should be understood that the lower platen 12 may be moved with respect to the upper platen 14 instead. Additionally or alternatively, both platens 12, 14 may be configured to be movable with respect to one another. All options are possible and considered within the scope of this disclosure. Although the remainder of this discussion focuses on a movable upper platen 14, it should be understood that these other versions may be implemented using the same technology described herein. The lower platen 12 is generally positioned parallel with respect to a lower surface or jet plate of the oven. The upper platen 14 is supported by the vertical support system 20 and moves therealong in order to be positioned between an open position, a closed position and a cooking position. In its open position, the upper platen 14 is generally parallel to the lower platen 12 so that the two platens 12, 14 define an open space between all edges of the platens (including the front edges as well as the back edges). They are not hinged together.

Figure 2:
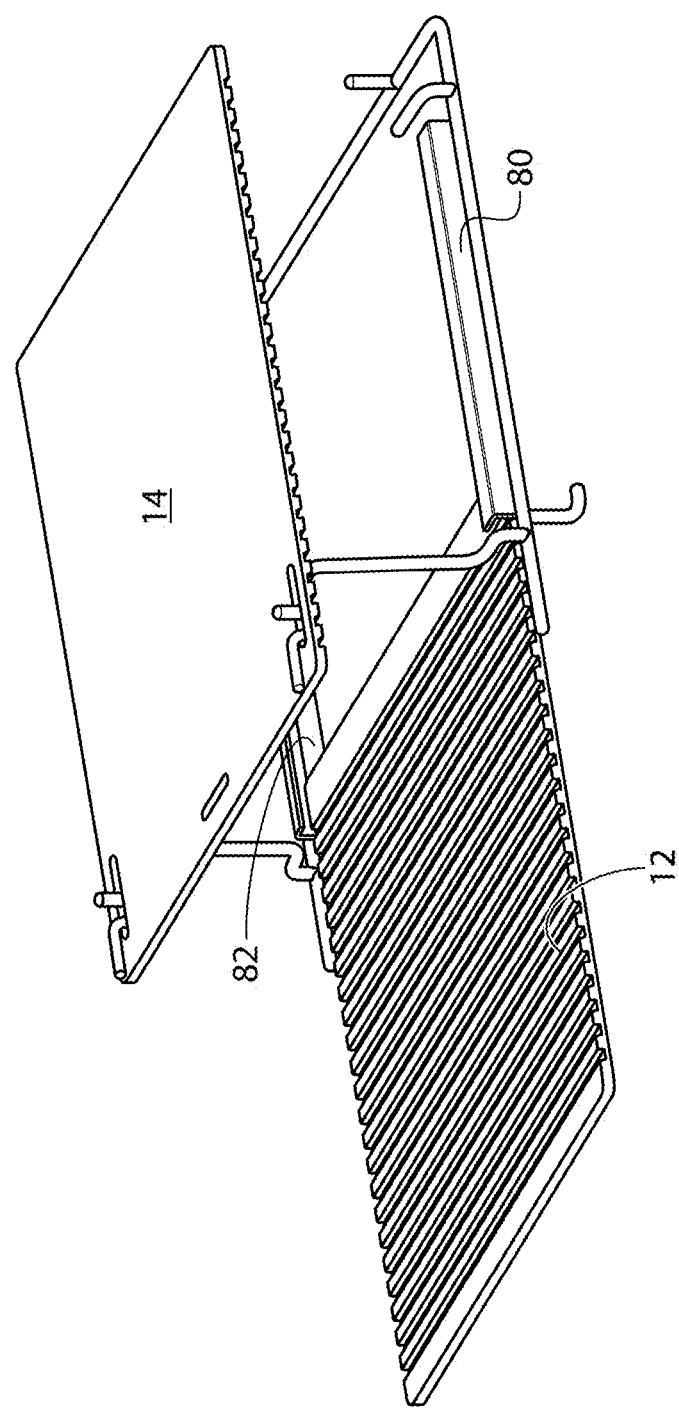
FIG. 2 shows the oven system frame of FIG. 1 with a lower platen in the process of being positioned.

In one embodiment, a standard oven can have the system 10 easily installed. In one example, the base structure of the system may be a wire rack or frame 80 that connects to the oven cavity. The frame 80 includes two vertical supports 22, 24. In one example, the frame 80 is formed as a wire rack with an inward facing lip 82 that can help support the lower platen 12 in use. FIG. 1 illustrates a frame 80 with an upper platen 14 in place and without a lower platen. FIG. 2 illustrates a lower platen 12 being positioned with respect to the frame 80. The lower platen 12 may rest on the inward facing lip 82 of the frame 80. The frame 80 may function like a drawer base, supporting the lower platen 12 as it slides in and out with respect to the frame 80. A side securement lip 84 may also be positioned on the frame 80. This side lip 84 can help prevent upward movement of the lower platen 12 once positioned.

The lower platen 12 is generally intended to remain stationary in use. The upper platen 14 is designed to be movable (i.e., raised and lowered) with respect to the lower platen 12, as described further below. The upper platen 14 may move along the vertical support system 20. In the examples shown, the vertical support system 20 is provided as first and second vertical supports 22, 24. One or both of the platens 12, 14 have vertical support system cooperating openings 26, 28 along plate edges 30. These openings 26, 28 are sized and shaped to receive vertical supports 22, 24 and to slide vertically as well as horizontally with respect thereto.

In one example, each of the lower and upper platens has a ribbed surface 32 and a flat surface 34. It is generally envisioned that the ribbed surface 32 be positioned on one side of the platen and that the flat surface 34 be positioned on the opposite side of the platen. However, it is also possible for a single surface of the platen to have both a ribbed surface and a flat surface on the same side. The ribbed surface 32 is designed to provide grill marks on the food item due to heat and compression. The flat surface 34 can still heat and compress the food item, but it does not provide grill marks due to the flat nature of the surface that remains in contact with the food item. In other examples, both the top and bottom surfaces of one or more of the platens may both be ribbed or both the top and bottom surfaces of one or more platens may both be flat. Any combination of these options is also envisioned. In the example illustrated by FIGS. 2-7, the ribbed surface 32 of the upper platen 14 is facing down and the ribbed the surface 32 of the lower platen 12 is facing up. This allows grill marks to be positioned on both sides of the food item compressed therebetween. Other configuration options are possible and considered within the scope of this disclosure.

The platens 12, 14 may be removed from the vertical support system 20 in order to switch between the ribbed surface 32 or the flat surface 34. The platens 12, 14 may be also removed from the oven for cleaning. In one example, the platens 12, 14 and the frame 80/vertical support system 20 may be assembled outside the oven and inserted as a complete rack system 10. Alternatively, the frame 80 may be positioned in the oven and then the platens 12, 14 positioned with respect thereto.

A specific embodiment of the oven rack system 10 for pressed food items described herein is intended for use with a rapid cook oven, such as the type manufactured and sold by TurboChef Technologies, Inc. of Carrollton, Tex. Such ovens are generally intended for use in commercial food preparation and serving establishments. The oven rack system 10 finds particular use in connection with ovens that deliver forced hot air in combination with a microwave system, which can lead to a fast cooking process. However, it is also possible for the oven rack system 10 for pressed food items described herein to be used in connection with residential ovens or toaster ovens. In these instances, the securement of the rack with respect to the cooking cavity may be accomplished via the systems described herein or by any other appropriate securement systems appropriate for the oven in which the rack is used.

Figure 3:
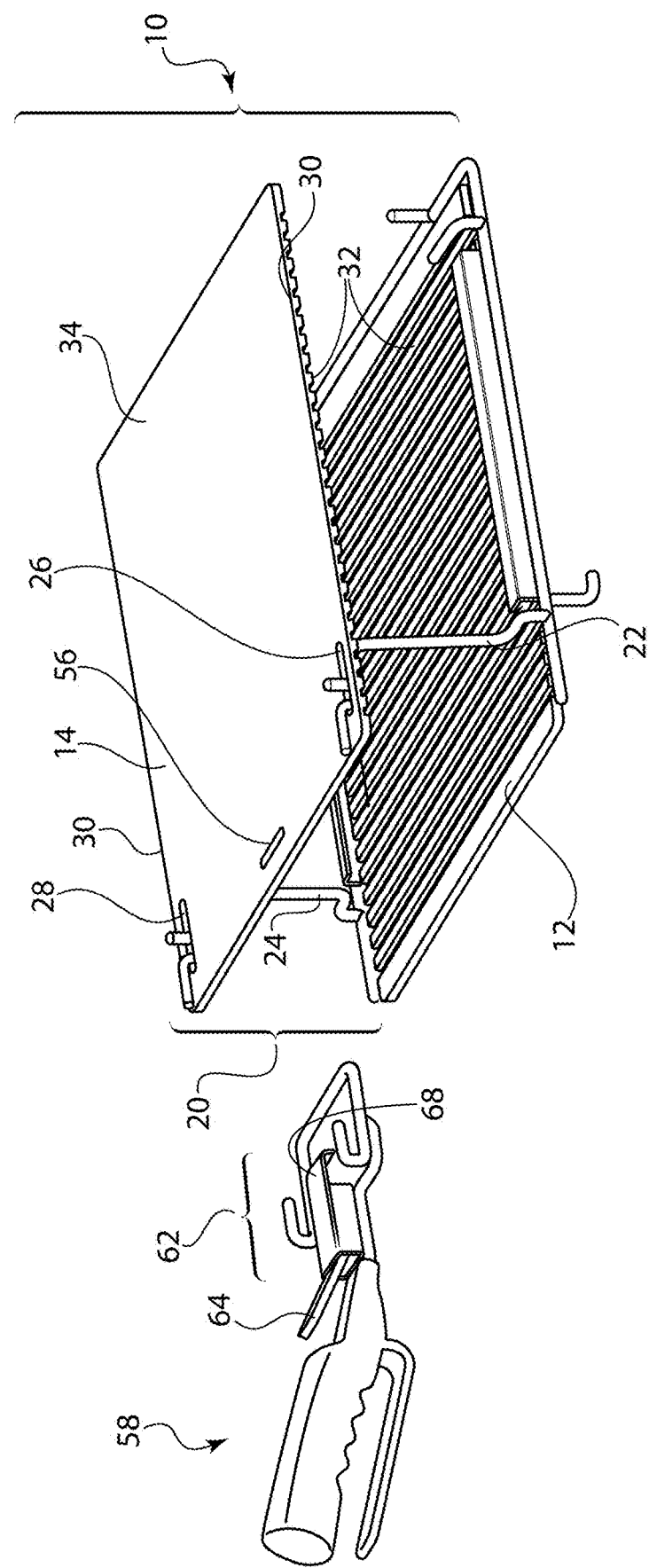
FIG. 3 shows an oven system frame with an upper platen in the open position and a lower platen in a stable secured position.

FIG. 3 illustrates the complete rack system 10 as it would be positioned within an oven. The upper platen 14 is shown in an open position. In this position, the first and second vertical supports 22, 24 extend through the openings 26, 28 of the upper platen 14. The openings 26, 28 of the upper platen 14 are positioned over the vertical supports 22, 24 so that upper portions of the supports fit inside the openings.

Figure 4:
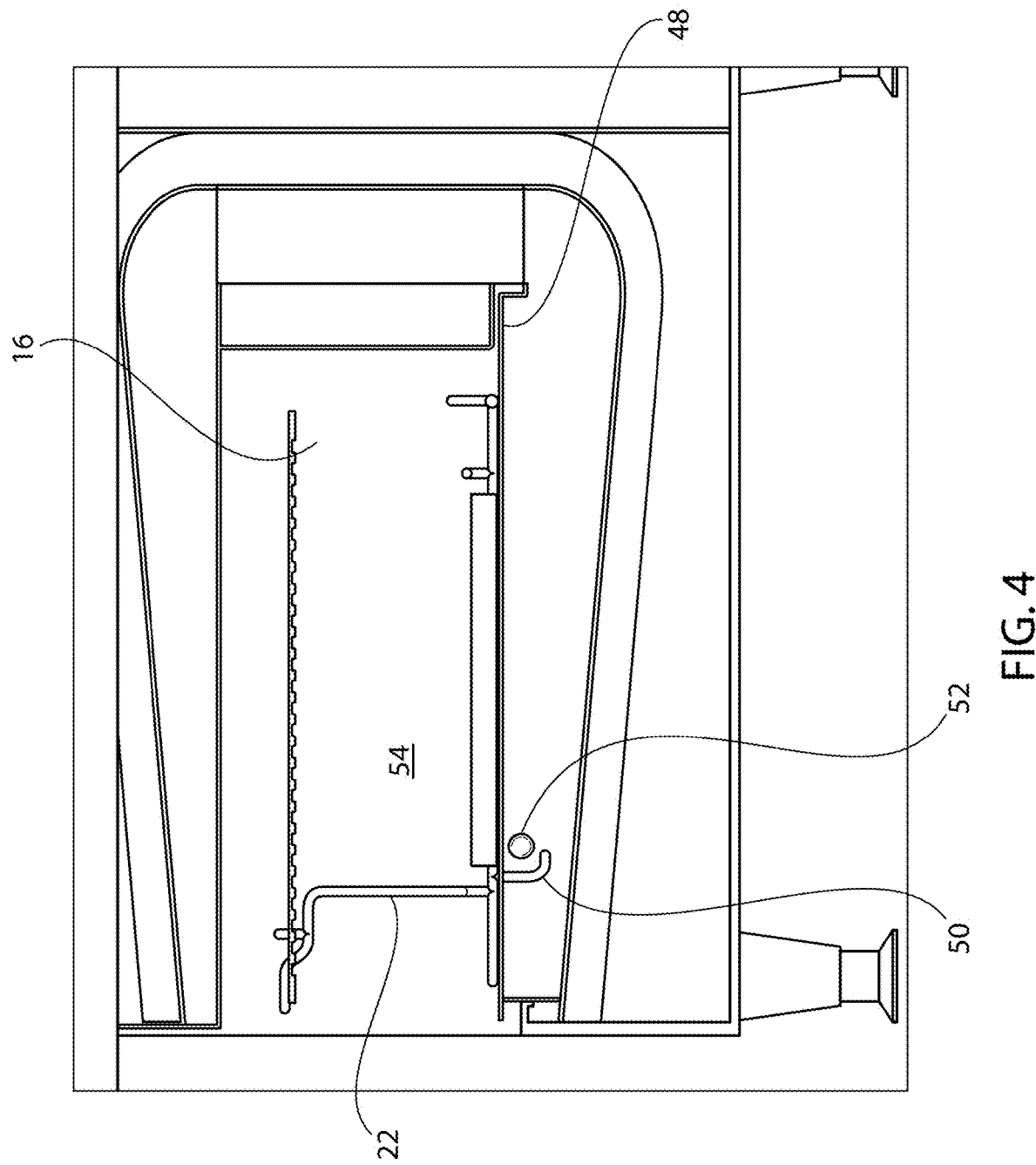
FIG. 4 shows a side plan view of an oven cooking cavity with an oven system for pressed food items positioned therein.

FIG. 4 illustrates one way in which the rack system 10 may be positioned within an oven cooking cavity 16. It should be understood, however, that securement of the rack system 10 into to the cooking cavity 16 may occur in various ways, some alternate versions of which are outlined at the end of this document. In the example illustrated, the frame 80 is stably secured with respect to the cooking cavity 16. The frame 80 is positioned with respect to a lower jet plate 48. The frame 80 has a lower connection feature 50. In the figures, the lower connection feature 50 is illustrated as a curved hook. The lower connection feature 50 can extend through a slot in the lower jet plate 48. The lower connection feature 50 can engage a stud 52 along an inner cavity wall 54. Although it is possible for only one of the securement options to be used, a combination of both can help confirm a secure positioning. Engagement of the lower connection feature 50 with the stud 52 locks the frame 80 into place. The frame 80 may be pushed forward in order to engage the lower connection feature 50 with the stud 52. Once the connection feature 50 has engaged the stud 52, the rack frame cannot move vertically. This securement also locks the jet plate 48 in place. The upper platen 14 is free to move along the vertical supports. In order to remove the rack frame from the oven, the frame can be slid forward and tilted so that the connection feature 50 slides away from and disengages the stud 52.

Figure 5:
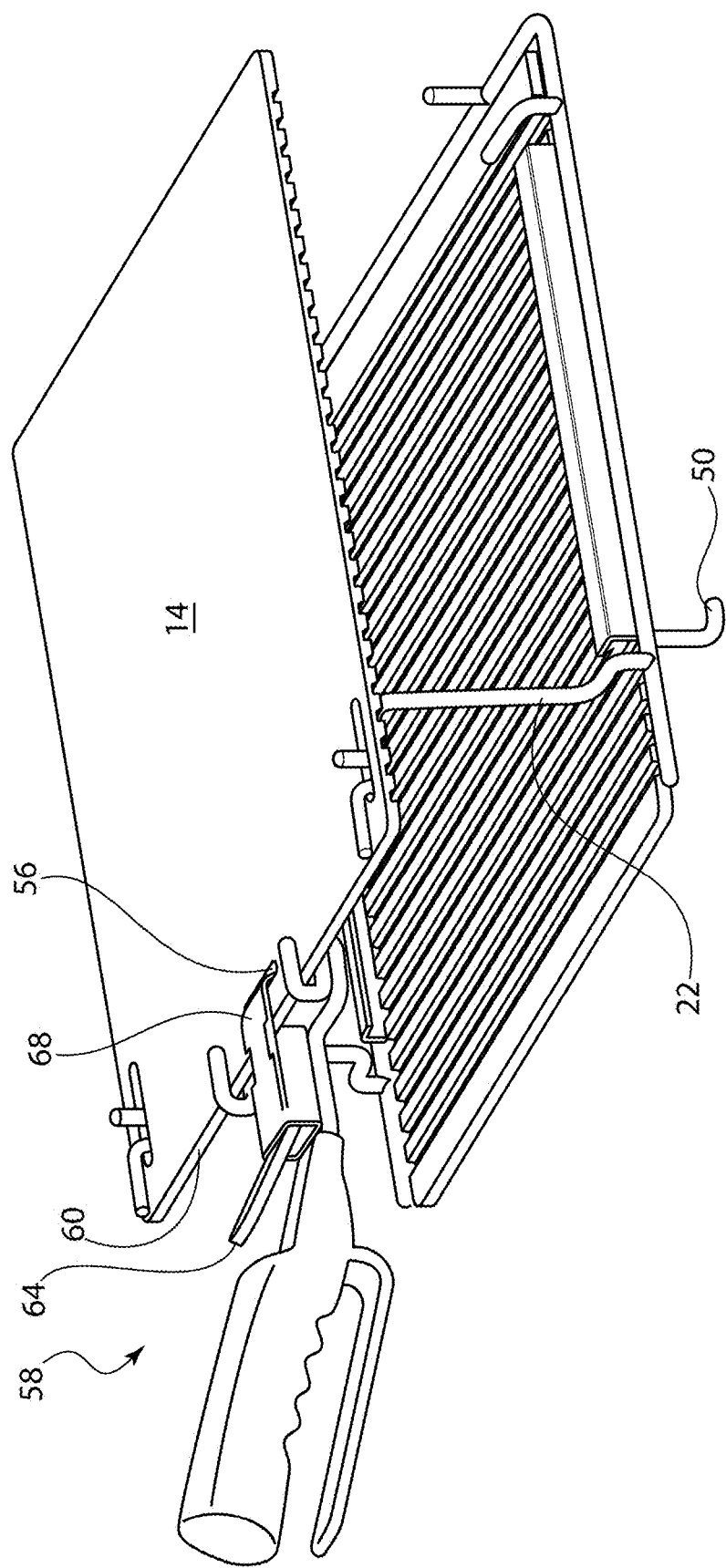
FIG. 5 shows a side perspective view of the oven system of FIG. 3, with a detachable handle secured to the upper platen.
Figure 6:
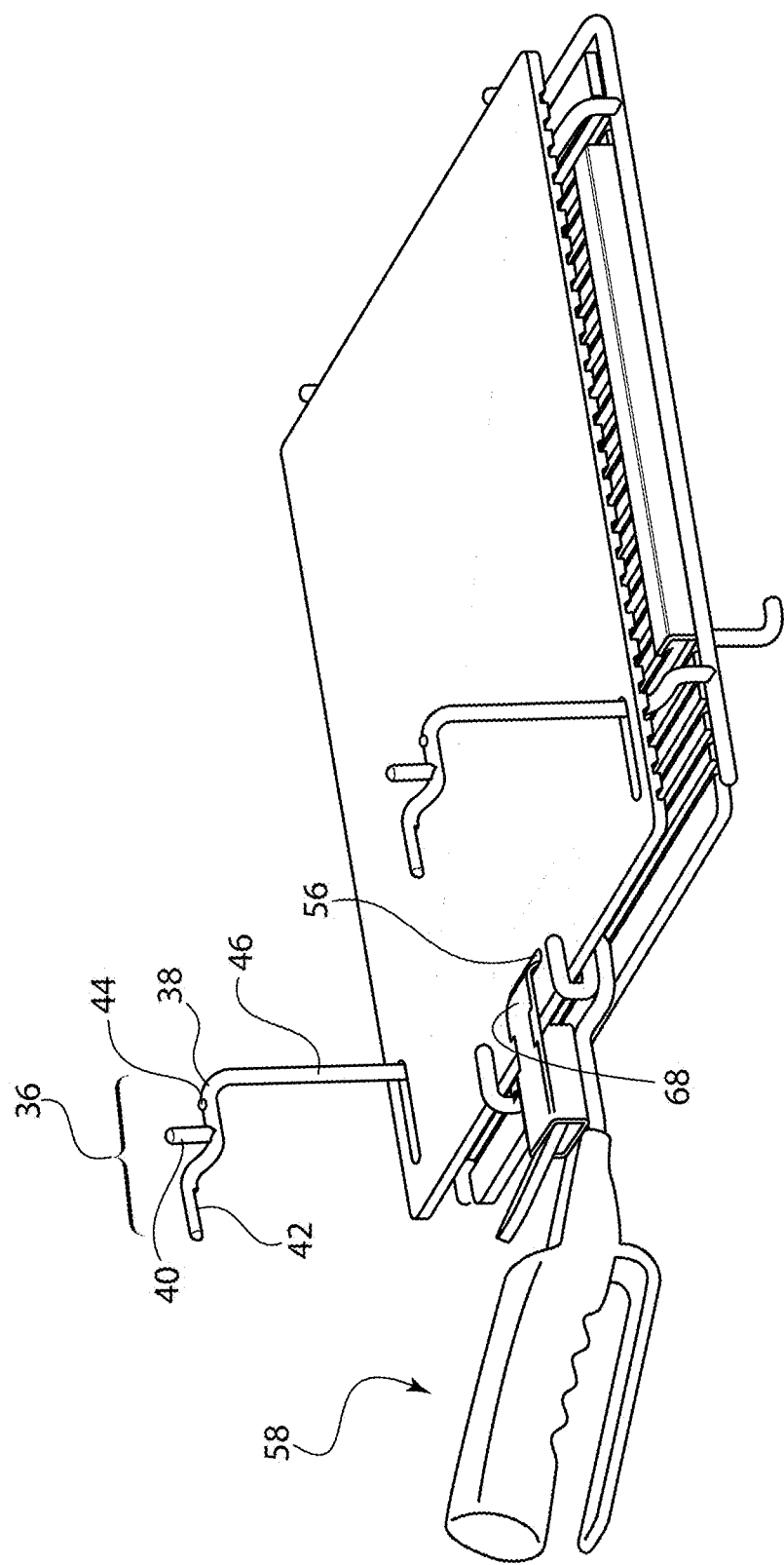
FIG. 6 shows a side perspective view of the oven system of FIG. 3, with the upper platen moved to the closed position.

When the upper platen 14 is in the open position, the upper platen 14 is allowed to rest on a platform support 36 of each vertical support. For ease of discussion, a single vertical support 22 and platform support 36 is described, although it should be understood that both vertical supports have the same features. FIGS. 3-5 illustrate the platform support 36 with the upper platen 14 supported thereby. FIG. 6 illustrates the upper platen 14 once moved away from the platform supports 36 (and shows features of the platform supports more clearly).

Each platform support 36 provides a surface on which the upper platen may rest and be supported. In a specific example, a platform support 36 may have a first horizontal element 38. The first horizontal element 38 is illustrated as having a stop post 40. In use, the stop post 40 prevents the upper platen 14 from moving too far forward or too far back with respect to the vertical support 22. The stop post 40 abuts an edge of one of the platen openings 26, 28. The first horizontal element 38 is also illustrated as having a detent system. In a specific embodiment, the detent system may be formed via cooperation between a nub 44 and a similarly-shaped indentation (not shown) in a lower surface of the upper platen 14. Because the platens may be reversible, an indentation may be provided along a similar location on both a top surface and a bottom surface of the upper platen 14. (Although it should be understood that the nub and detent locations may be reversed.) The platform support 36 is also shown as having a second horizontal element 42. This second horizontal element 42 may extend up through openings 26, 28 in use, as illustrated by FIG. 5.

Figure 9:
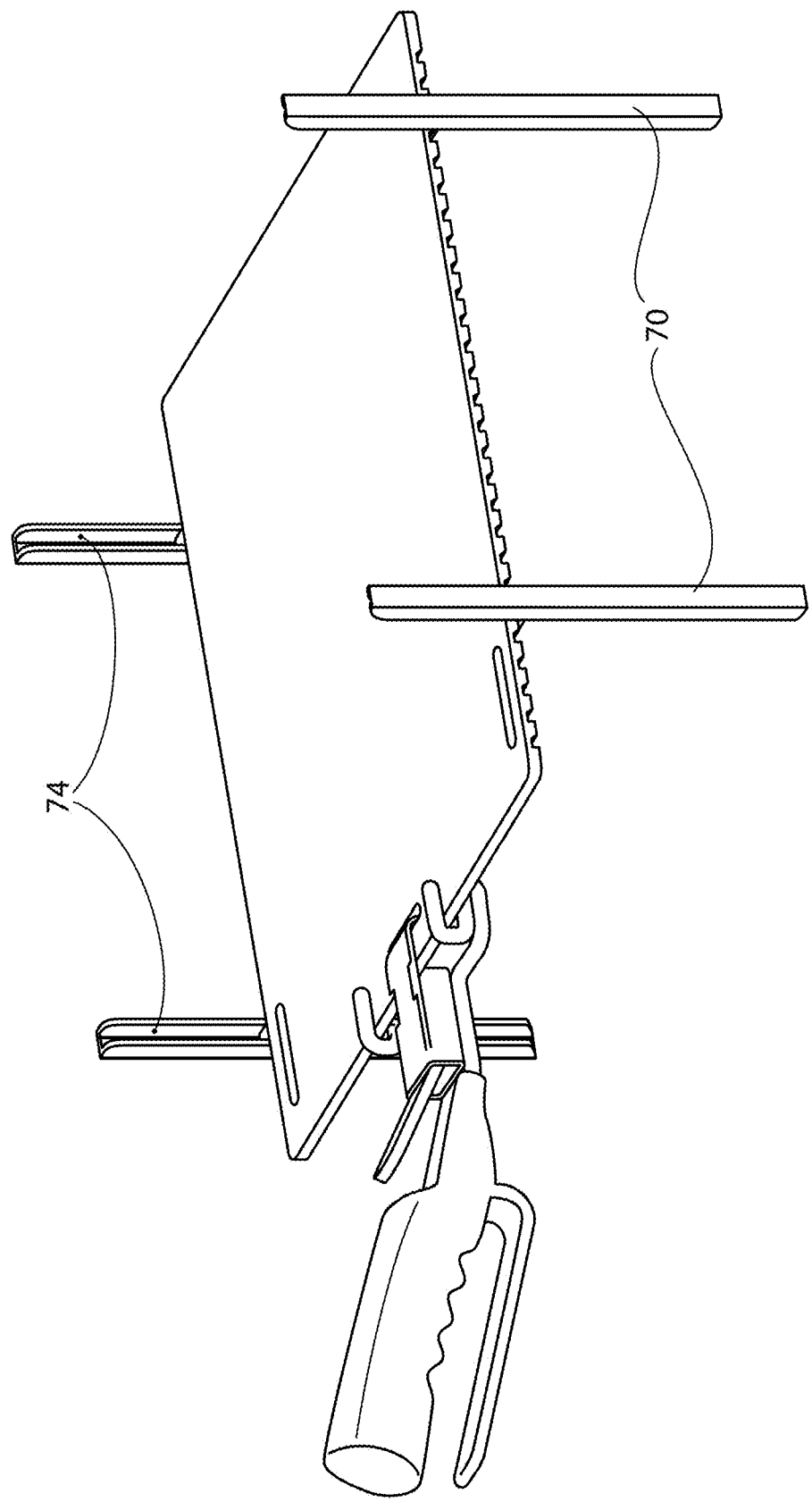
FIG. 9 shows a side perspective view of an alternate embodiment of a vertical support system that uses vertical tracks.
Figure 10:
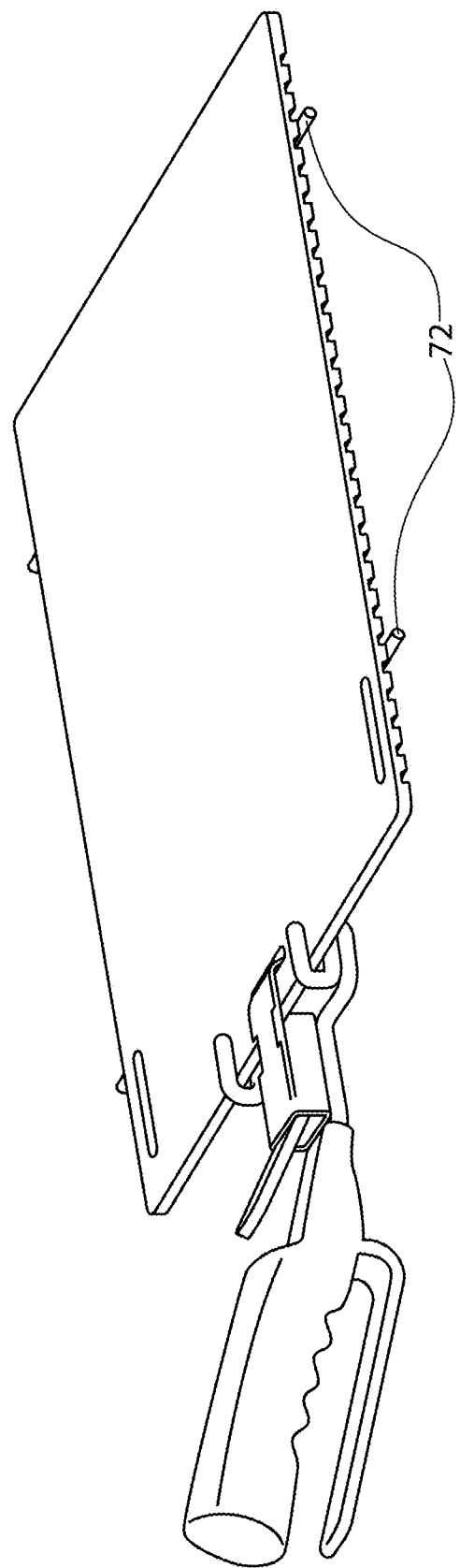
FIG. 10 shows a perspective view of an upper platen for use with the vertical tracks shown in FIG. 9.

In an alternate example, the vertical support system may be a vertical track 70, as illustrated by FIG. 9. In this example, one or more vertical tracks 70 may be installed along sidewalls of the cooking cavity. In the example shown, there are four vertical tracks 70 in use. It is possible, however, to provide a single pair of vertical tracks, one along each side wall of the oven cooking cavity. Additional further tracks 70 may be used as well. The vertical tracks 70 are generally provided with an inner channel 74 that is sized and configured to receive a side peg 72 of the upper platen. The inner channel 74 may be notched, such that the side peg 72 may be stopped along any desired height. In another example, only the upper portion of the inner channel 74 is notched in order to receive and secure the side peg 72 in place so that the upper platen may be stopped and secured in its open position.

Figure 11:
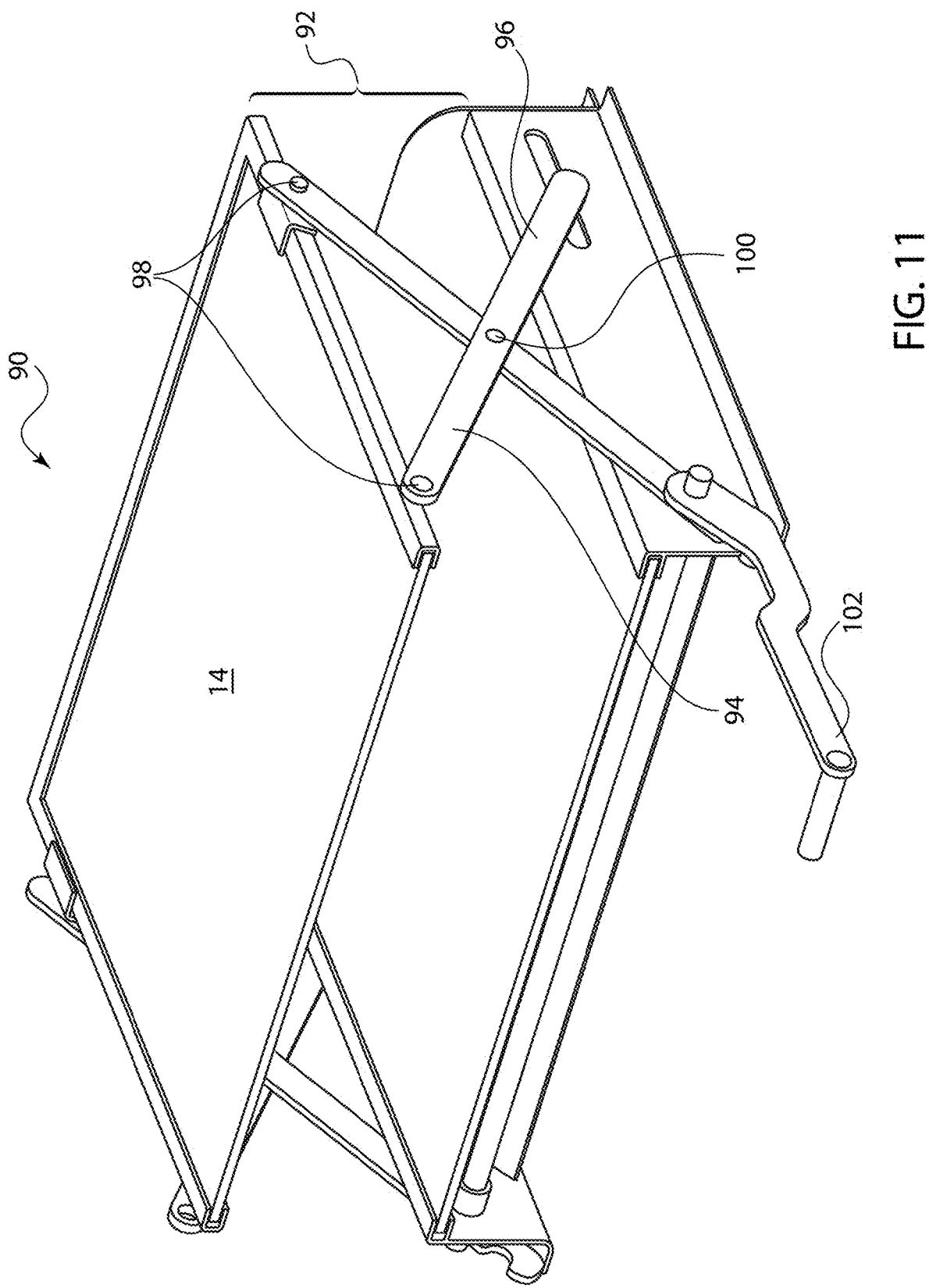
FIG. 11 shows a side perspective view of an alternate embodiment of a door-activated pressing system.

In a further alternate example, it is possible for the upper platen to move via operation of the oven door. In this version, opening and closing of the oven door causes raising and lowering of the upper platen. One example of such a door-activated pressing system 90 is illustrated by FIG. 11. This system 90 includes a scissor mechanism 92 that functions to raise and lower the upper platen 14. First scissor arm 94 is secured to an upper front portion of the upper platen 14 and a lower rear portion of the lower platen 12. Second scissor arm 96 is secured to an upper rear portion of the upper platen 14 and a lower front portion of the lower platen 12. Securement may be via pivot points 98. Central pivot 100 allows the scissor arms 94, 96 to raise and lower upon movement of actuating arm 102. As illustrated, actuating arm 102 is secured to at least one of the pivot points such that movement of the arm 102 causes movement of the scissor mechanism 92. Actuating arm 102 may be secured to a lower pivot point or an upper pivot point. The actuating arm connecting pivot point may be positioned directly on or along one of the platens. In another example, the actuating arm connecting pivot point may be positioned on a base frame that supports one of the platens. In one embodiment, the actuating arm 102 is also secured to the oven door. Thus, when a user opens or closes the oven door, the actuating arm 102 is forced to raise or lower, which in turn causes activation of the scissor mechanism 92 to either raise or lower the upper platen 14.

In another example, the vertical support system (whether the vertical support rods or the vertical track embodiments) may be associated with the oven door, such that the upper platen is raised and lowered automatically by opening and closing of the oven door. For example, an arm may be secured to the upper platen that is also secured to the oven door, such that movement of the upper platen is caused by opening or closing of the oven door.

Figure 12:
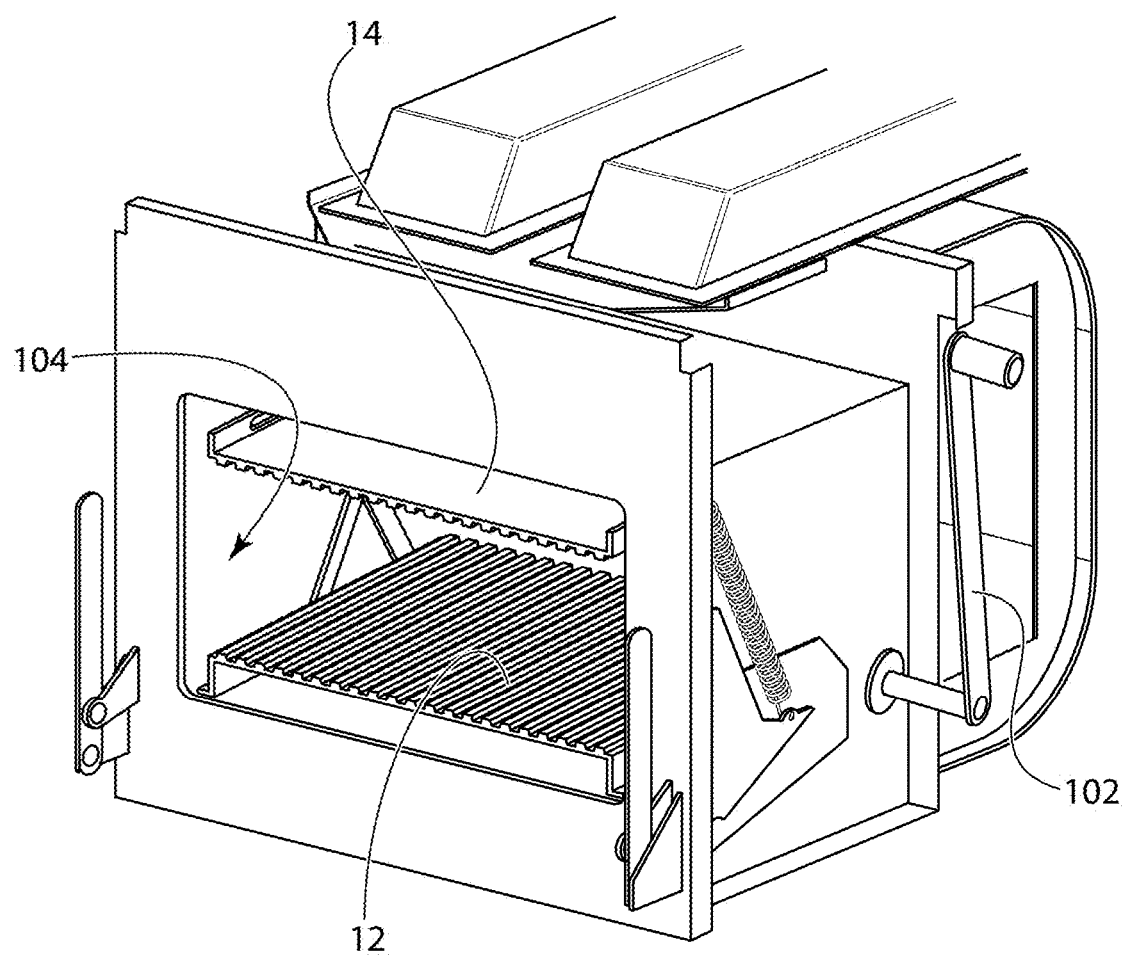
FIG. 12 shows a front perspective view of an oven cavity employing an external actuating arm, with the arm in a first position.
Figure 13:
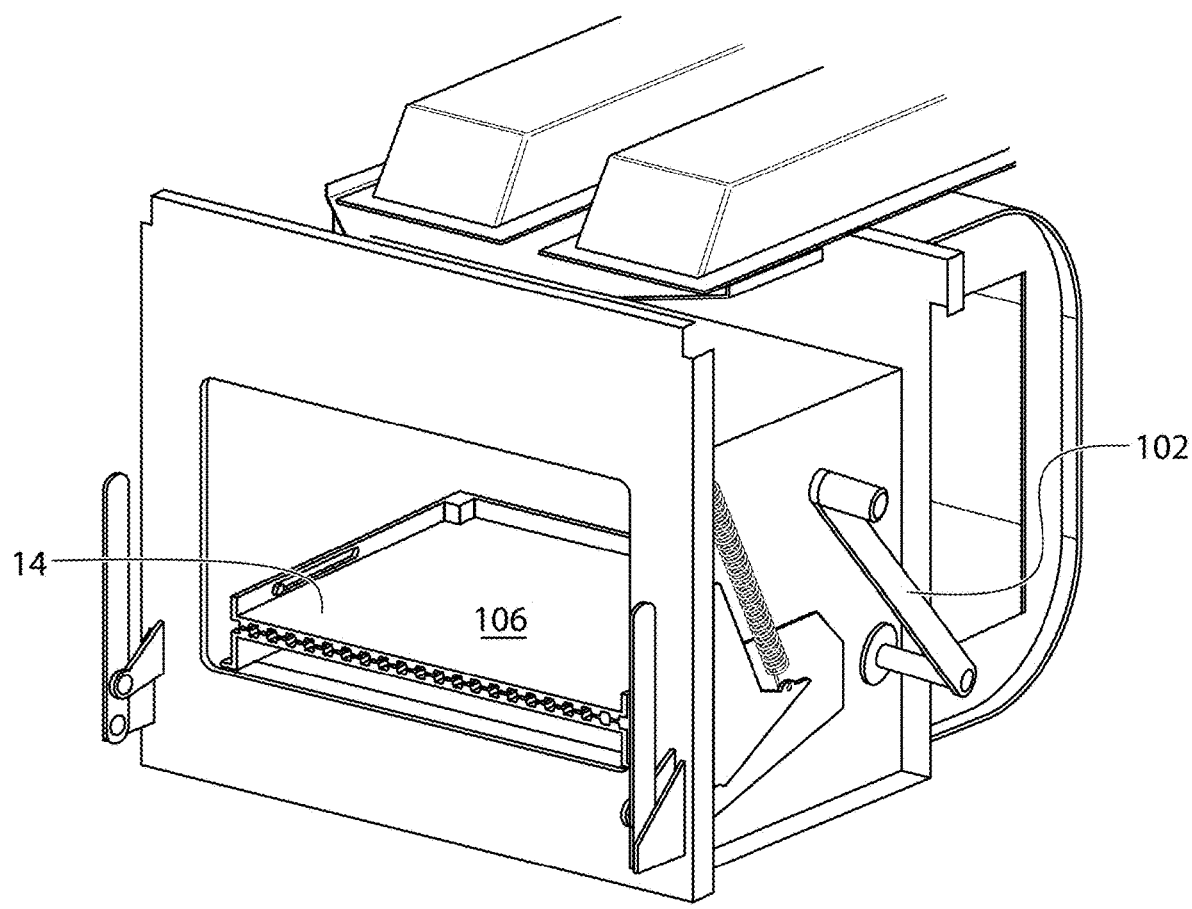
FIG. 13 shows a front perspective view of the oven cavity of FIG. 12, with the arm in a second position.
Figure 23:
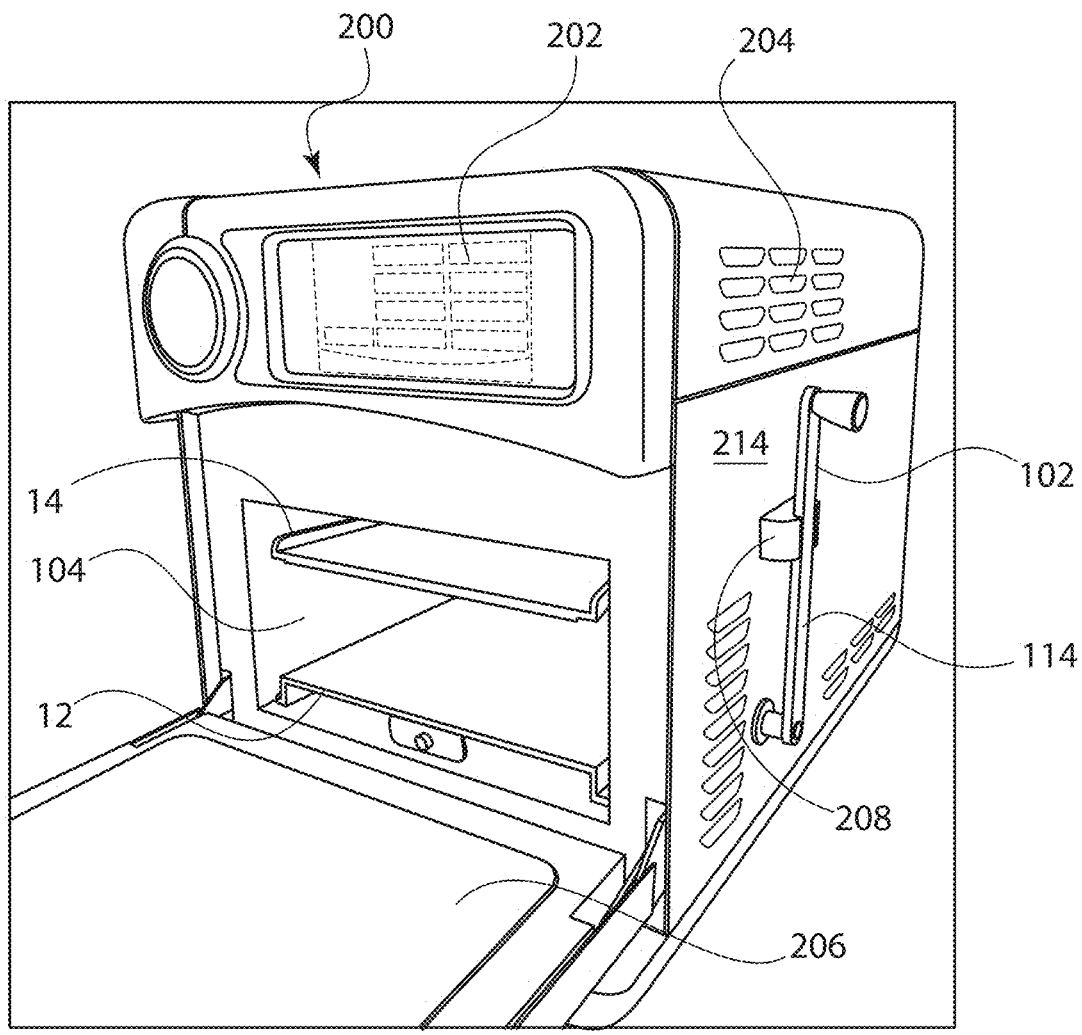
FIG. 23 shows a front perspective view of an oven housing with an actuating system positioned therein, with the handle of the actuation arm in a raised position.
Figure 24:
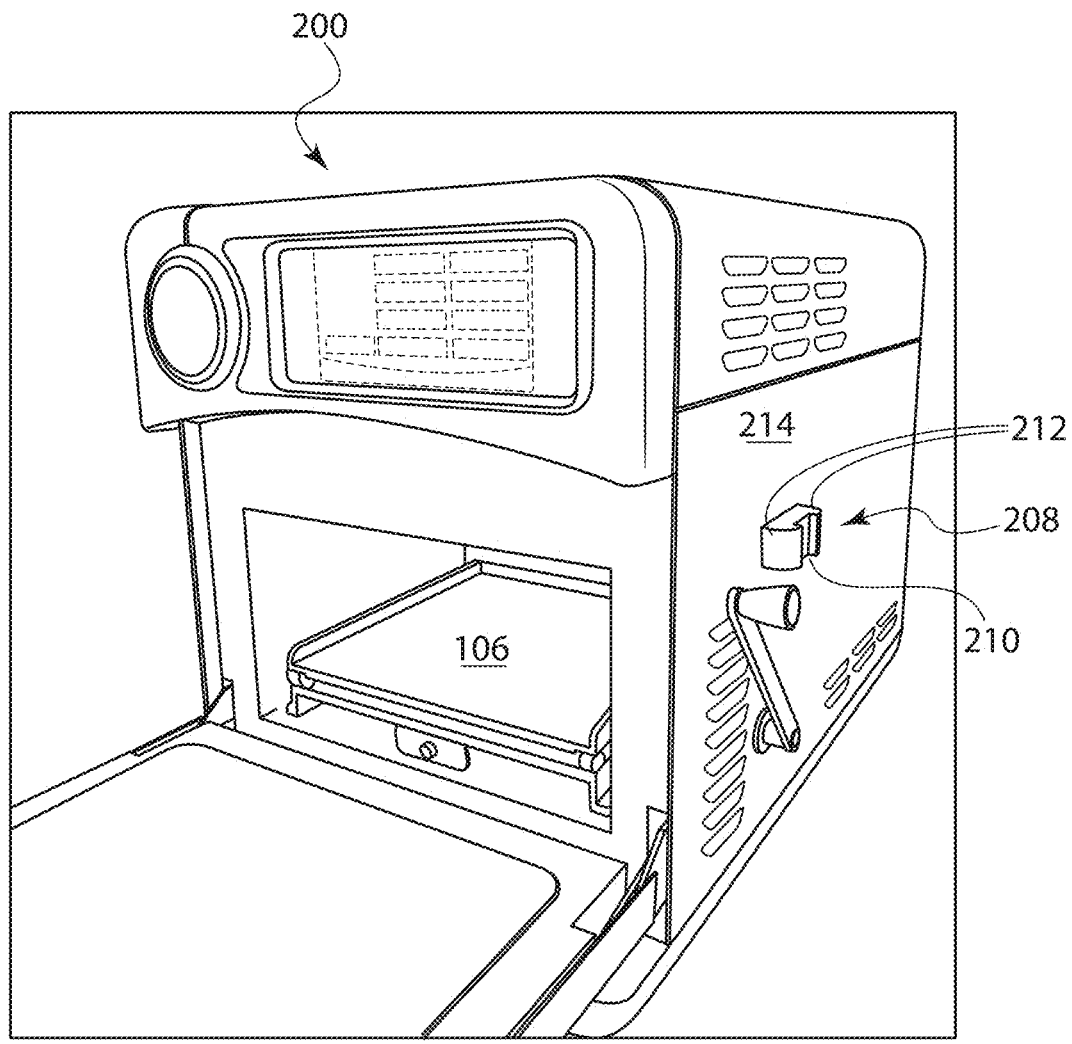
FIG. 24 shows a front perspective view of the oven housing of FIG. 23 with the handle of the actuation arm in a lowered position.

In an alternate embodiment, the actuating arm 102 extends outside the oven cavity 104, as illustrated by FIGS. 12-13 and 23-25. In these examples, the actuating arm 102 may be associated with one of the pivot points. In a first example, when the arm 102 is in a first position as illustrated by FIGS. 12 and 23, the platens 12, 14 may be held at a distance from one another. In a specific example, the upper platen 14 is raised away from the lower platen 12. When arm 102 is moved to a second position as illustrated by FIGS. 13 and 24, the platens 12, 14 are caused to move toward one another. In one example, this movement is caused by moving the actuating arm 102 forward about 45°. In a specific example, the upper platen 14 is lowered toward the lower platen 12 such that they are in a pressed food configuration shown.

Figure 25:
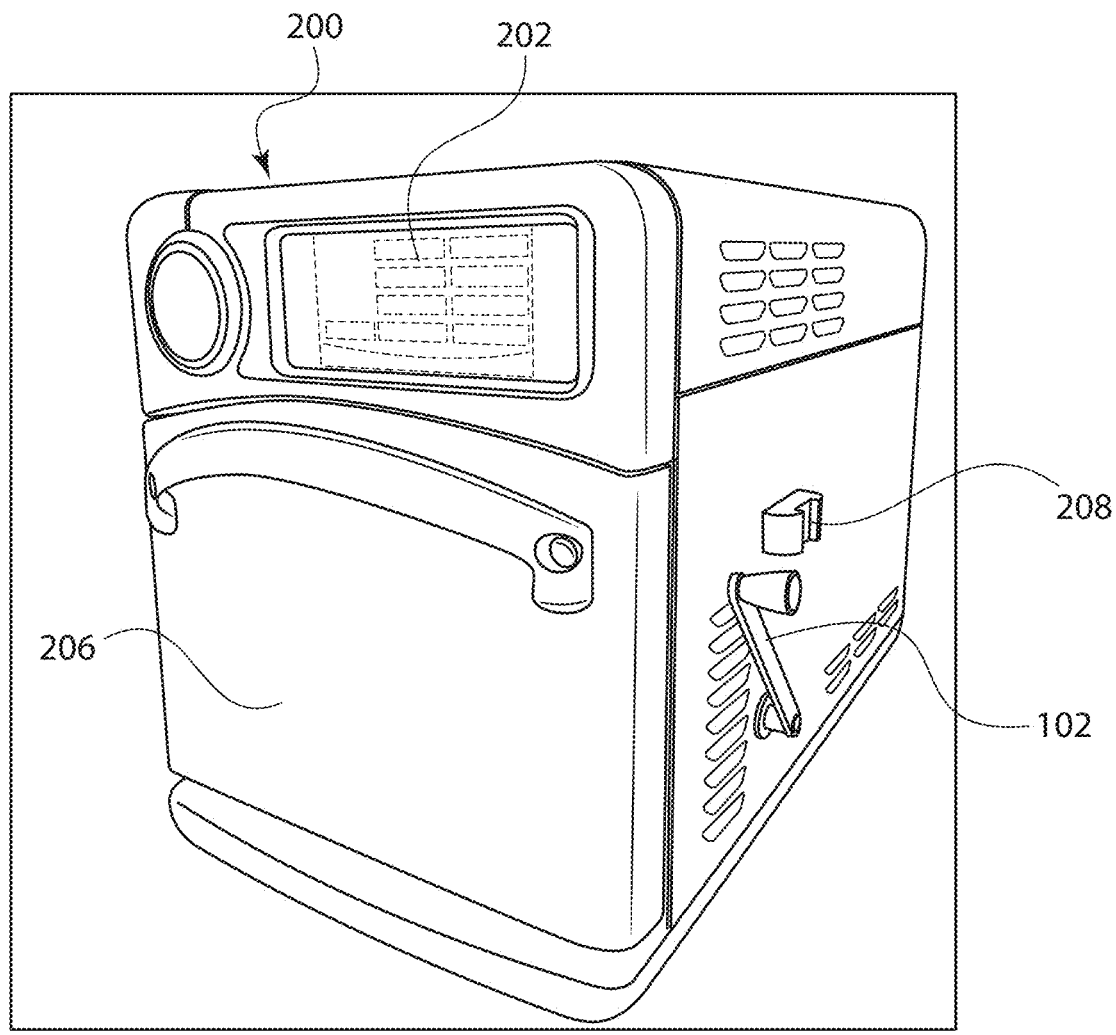
FIG. 25 shows a perspective view of the oven housing of FIG. 24 with the oven door closed.

FIGS. 23-25 show an example in which an oven housing 200 encloses the oven cavity 104. The oven housing 200 may support a user-interface screen 202 or other control system that allows a user to input oven temperatures, cooking times, and other parameters. It is also possible for the control system to have pre-set cooking options available. Oven housing 200 may also have vents 204, an oven door 206, and a number of other standard features. One new feature added to the housing 200 may be an actuating arm support 208. The support 208 may be provided with a channel 210 defined by sides 212, which can form somewhat of a U-shape configuration. When the arm 102 is raised, the shaft 114 of the arm is received in the channel 210. This is illustrated by FIG. 23. When the arm 102 is lowered, the shaft 114 of the arm is moved out of the channel 210. This is illustrated by FIG. 24. The support 208 may be made of plastic that ever so slightly malleable in order to allow in order to allow the shaft 114 to move over one of the sides 212 of the support 208. Additionally or alternatively, the side wall 214 of the housing 200 may be designed to have a slightly inward give, such that pressure on the support 208 can press the side wall 214 inward so that the shaft 114 can clear the channel 210.

Providing the arm 102 outside the cooking cavity 104 can be beneficial in providing various user options. For example, rather than the press option being tied with or otherwise connected to the process of opening and closing of the door itself, a user may desire to either not use the oven as a panini press at all, or may desire to activate the panini press option at a different time in the cooking process, independent of the door being opened or closed. This feature thus allows the oven to be used for traditional cooking processes and then converted to a pressed food item oven upon activation of the external actuating arm 102. Various cooking options are provided. For example, food product can be cooked between the plates (when pressed) to give it the panini grill marks. In other options, food product may be cooked on top 106 of the upper platen 14 in the position of FIG. 13 (or FIG. 24) if a more traditional griddle surface is desired.

Figure 14:
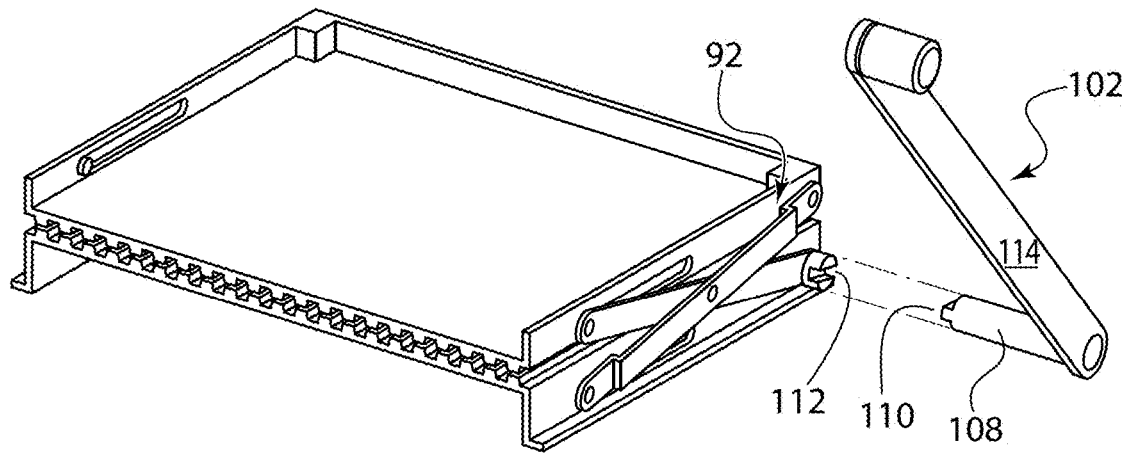
FIG. 14 shows a side perspective exploded view of one embodiment of a scissor mechanism configured to be moved via actuating arm.
Figure 15:
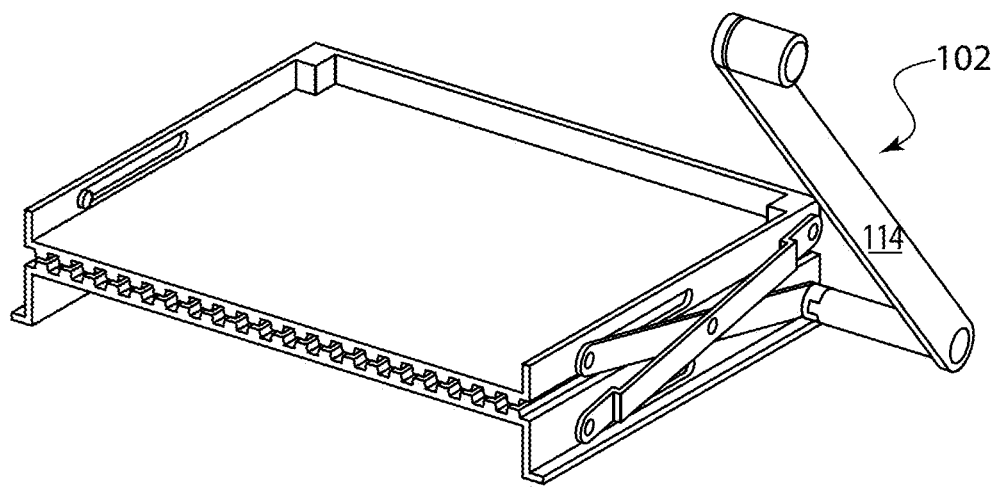
FIG. 15 shows the scissor mechanism of FIG. 14 secured to the actuating arm.
Figure 16:
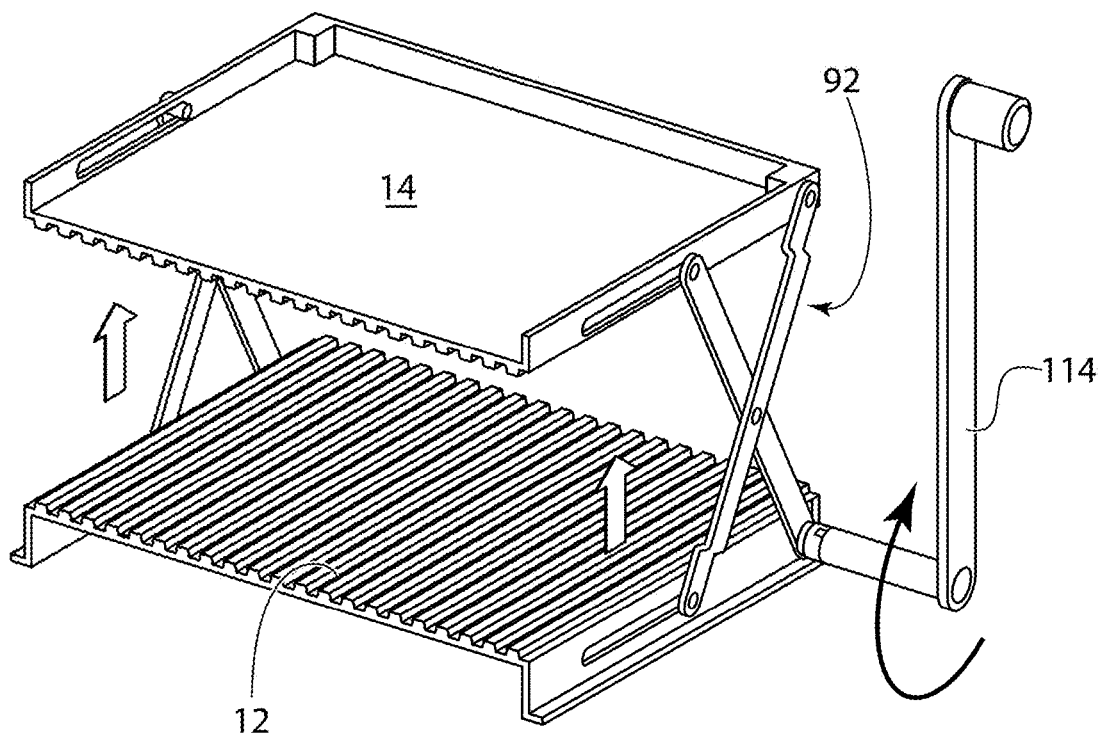
FIG. 16 shows a side perspective view of scissor mechanism of FIG. 15 with one of the platens having been raised by the actuating arm.

FIGS. 14-16 illustrate one embodiment of an actuating arm 102 attachment option. FIGS. 18-22 illustrate an alternate embodiment of an actuating arm attachment option with an actuation system. Referring first to FIGS. 14-16, which illustrates an oven cavity 104 without a housing enclosure 200 actuating arm 102 may have an extension portion 108 designed to interface with a scissor mechanism 92 between the platens 12, 14. In a specific example, extension portion has a tab 110 configured to be received by a tab receiver 112. It should be understood, however, that tab 110 and tab receiver 112 locations may be reversed. Additionally, alternate mating system options are possible and considered within the scope of this disclosure. Extension portion 108 is provided in order to extend the actuating arm 102 an appropriate distance such that the actuating arm 102 can be positioned outside of the cooking cavity 104. A handle shaft 114 extends from extension portion 108. Handle shaft 114 is the component intended to be raised and lowered in order to move the platens 12, 14 that are positioned inside the cooking cavity 104. (As shown, a grip portion may be associated with handle shaft 114. Or other handle configurations are possible and considered within the scope of this disclosure.)

As illustrated by FIG. 15 and FIG. 16, movement of the handle 114 causes the mated cooperation between tab 110 and tab receiver 112 to force movement of the scissor mechanism 92. This raises or lowers the platens with respect to one another respectively.

Figure 17:
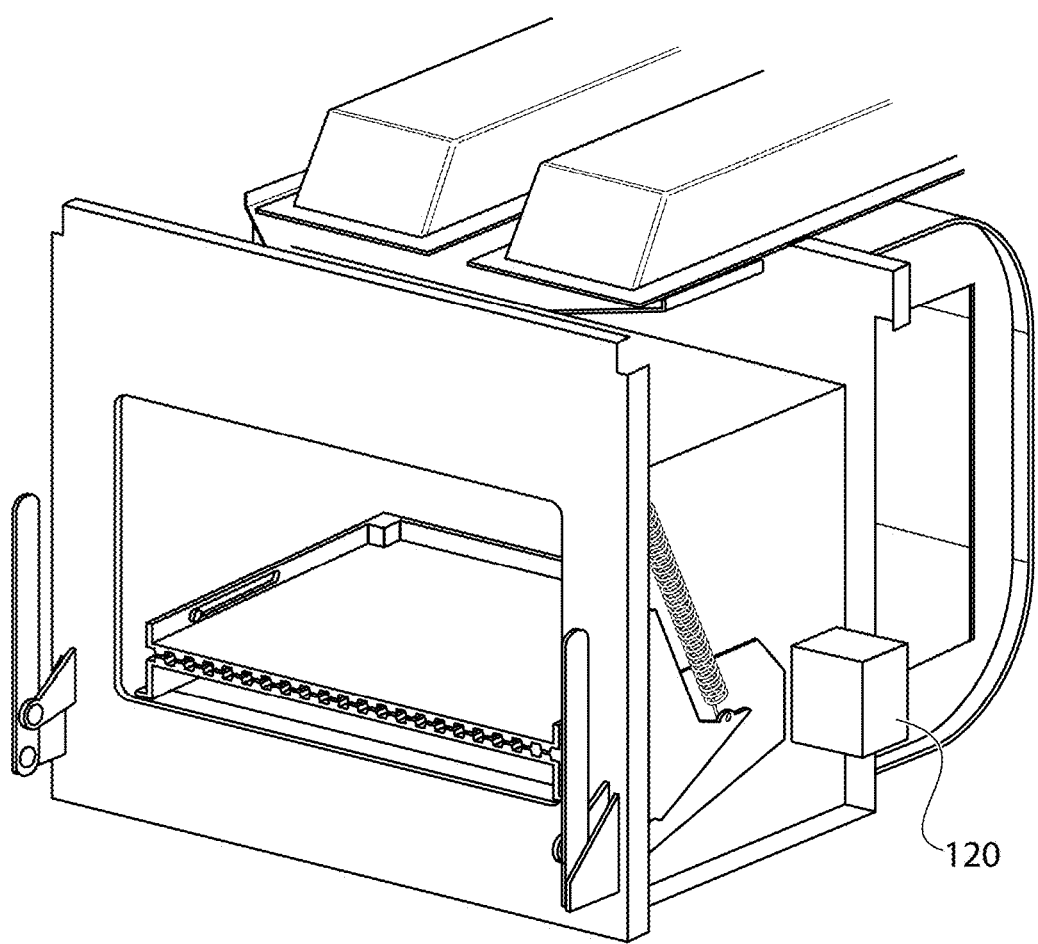
FIG. 17 shows a side perspective view of an oven cavity controlling internal platens via use of a motor.
Figure 18:
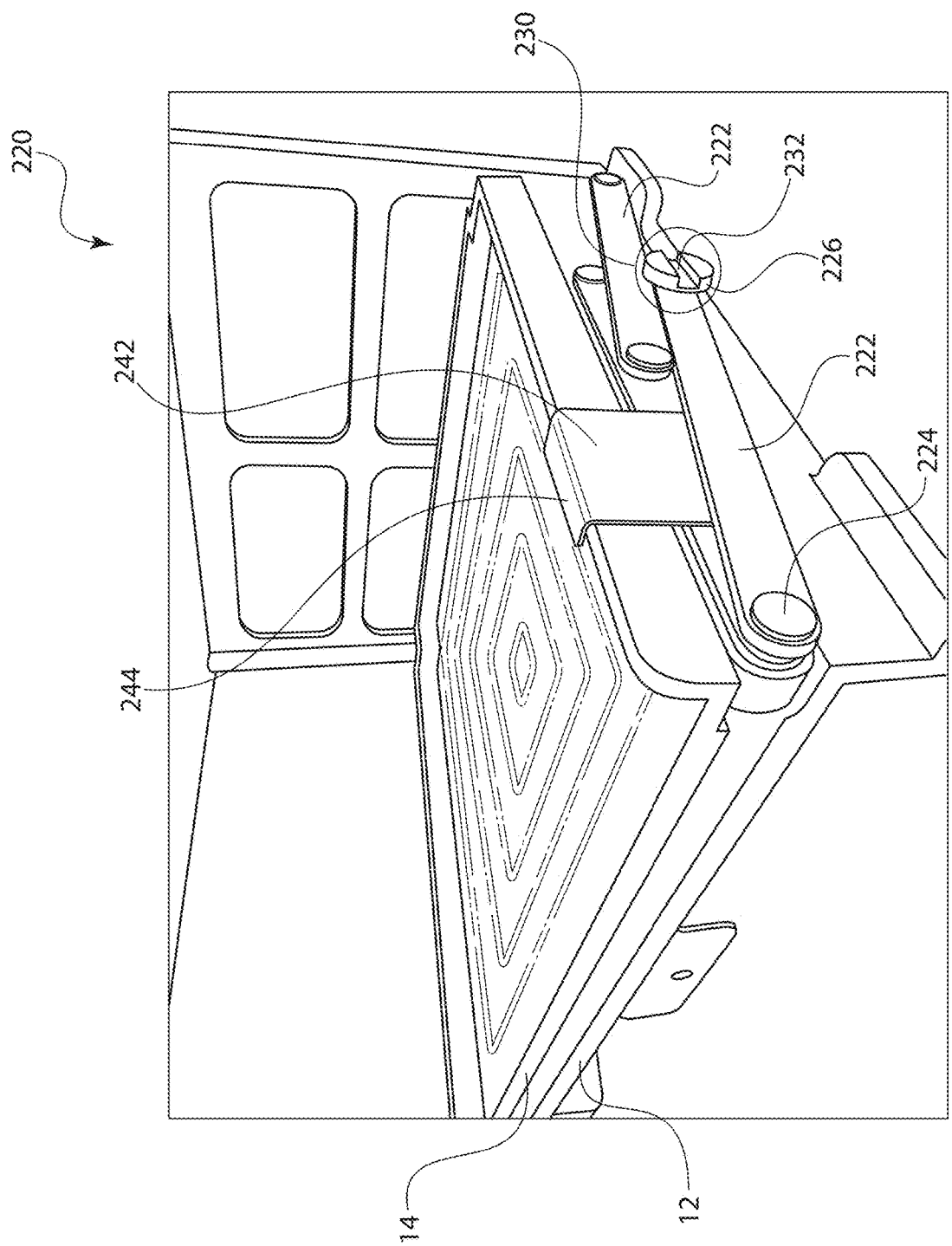
FIG. 18 shows a side perspective view of an alternate actuating system.
Figure 19:
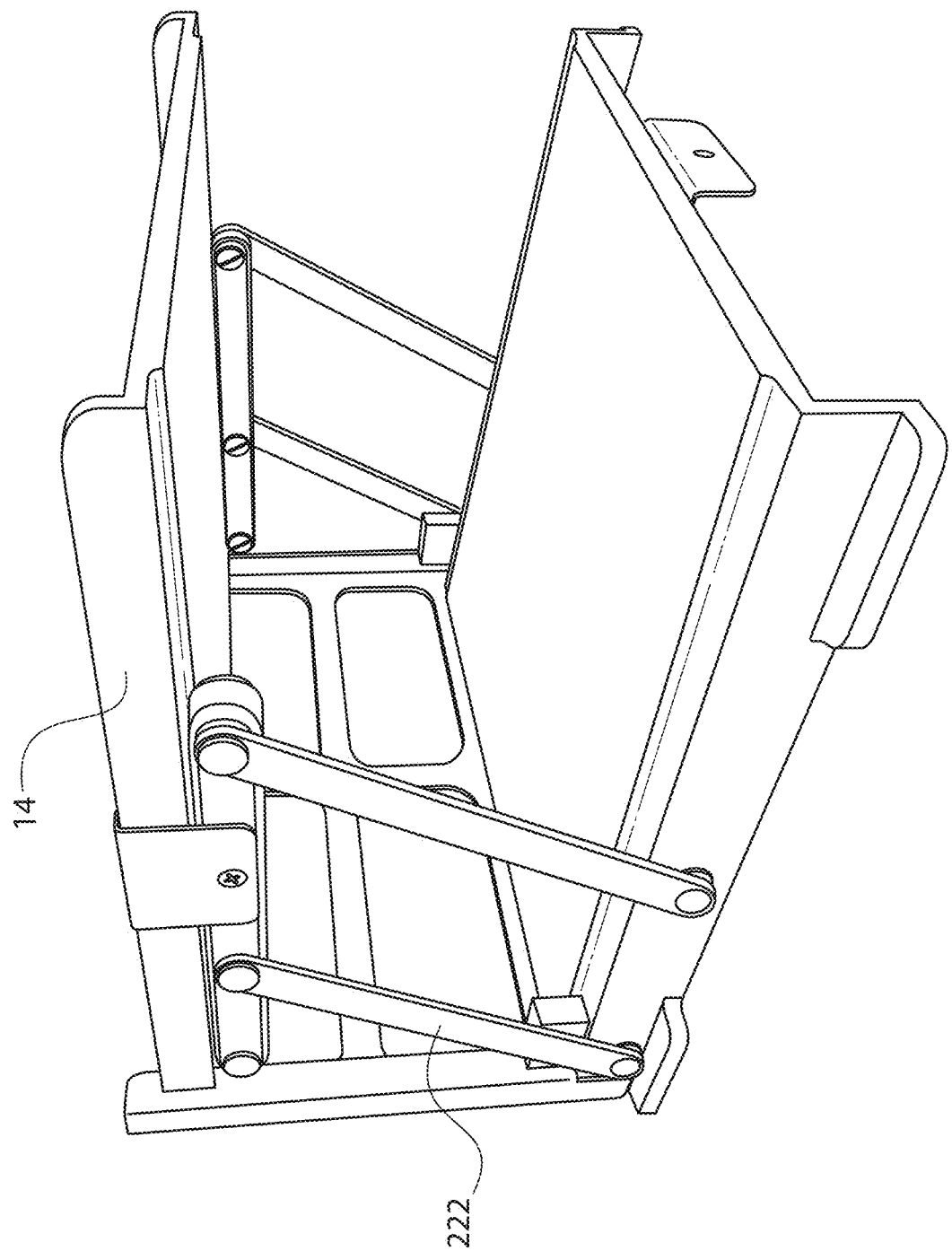
FIG. 19 shows a side perspective view of the actuating system of FIG. 18.
Figure 20:
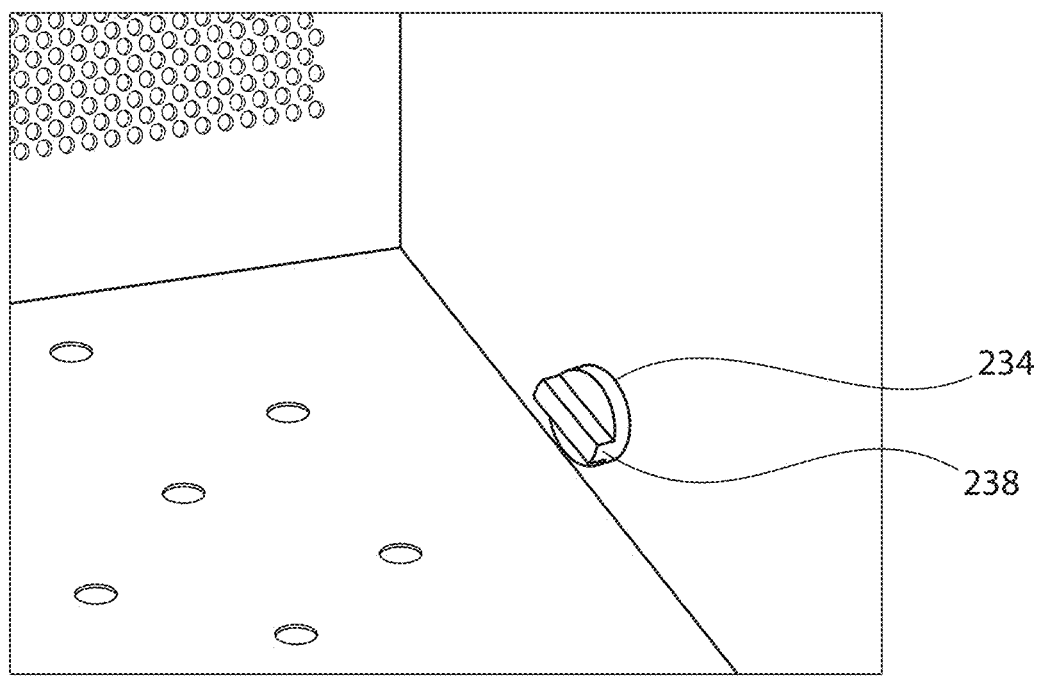
FIG. 20 shows a perspective view of an oven cavity with a rotation actuator in place.

As illustrated by FIG. 17, in an alternate embodiment, the platens 12, 14 may be associated with a motor 120 that is configured to cause movement of the platens based on various user settings. In a specific example, the motor 120 may be a stepper motor with a drive mechanism that moves the platens 12, 14 with respect to one another. It may be possible for a user interface to be associated with the motor 120 such that a user may select a particular sandwich thickness. In a specific example, the user may desire to have the platens 12, 14 remain a particular distance from one another, such as one inch or ½ inch. Alternatively, the user may desire to have the platens 12, 14 move until the moving platen detects presence of a food article and then press ¼ inch further. Other options are obviously possible and considered within the scope of this disclosure. Although the motor 120 is shown in one exemplary location, this figure is not intended to be limiting and it should be understood that the motor may be positioned anywhere with respect to the oven cavity 104 or the housing 200 as desired.

A further example is illustrated by FIGS. 18-22. In the embodiment illustrated by these figures, the platens 12, 14 are moved via an actuation system. The actuation system includes various features described. First, the platens 12, 14 are mounted on a frame 220 via hinged connectors 222. Two hinged connectors 222 are shown, but it should be understood that this design may be implemented with only a single hinged connector 222. A first connector end 224 is pivotably secured to the upper platen 14 and a second connector end 226 is pivotably secured to the lower platen 12. Pivotal securement may be accomplished via an opening in the side of the platen the receives a pin of the connector that can rotate/pivot with respect to the opening (or vice versa). Other mechanical options are possible and considered within the scope of this disclosure. In the embodiment illustrated by FIG. 19, movement of the hinged connector(s) 222 causes consequent movement of the upper platen 14. (This is because the lower platen 12 is designed to be stably secured in place in the oven, as will be described below, and it is not designed to move in use. Thus, raised movement of the hinged connector(s) 222 causes raised movement of the upper platen 14.)

Although the actuating arm 102 and motor 120 embodiments are described above with respect to the scissor mechanism, it should be understood that an actuating arm 102 or a motor 120 may be used to raise or lower the platens 12, 14 in any of the alternate platen embodiments described above, below, and otherwise herein. For example, an external actuating arm 102 may be designed to be associated with the vertical support embodiments described with respect to FIGS. 1-2, 4. In another example, the detachable handle described with respect to FIGS. 3, 5-10 may be activated via an external actuating arm 102 or a motor 120.

At least one of the ends 224, 226 of one of the hinged connectors 222 (if more than one hinged connector 22 is provided) has a rotatable element 230 with a groove 232 along its length. The groove 232 is configured to cooperate with an oven-side connection 234 of a rotation actuator 236, illustrated by FIGS. 20 and 21. The oven-side connection 234 is illustrated as an elongated protrusion 238 along the oven-side connection 234. It should be understood, however, that the groove 232 and the elongated protrusion 238 may be alternated, such that a protrusion is on the element 230 and a groove is on the oven-side connection 234. The rotation actuator 236 is shown as being positioned along a lower edge of the oven cavity 104.

Figure 22:
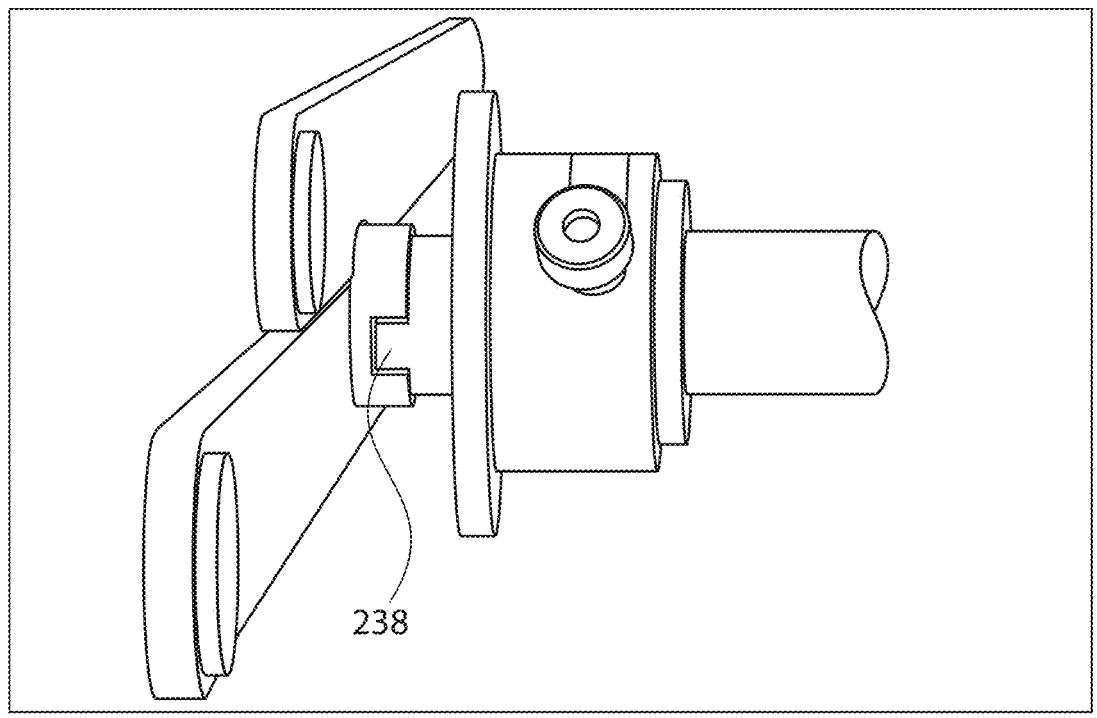
FIG. 22 shows a side view of cooperation between a groove of a rotatable element and an elongated protrusion of a rotation actuator.

When the frame 220 is to be positioned within the oven cavity 104, it is slid into the oven cavity 104, with the groove 232 and protrusion 238 aligned as shown in FIG. 22. In the example illustrated, the groove 232 slidingly receives the oven-side connection 234. This locks the frame 220 into place in the oven cavity 104. This also connects the frame 220 with the actuating arm 102.

Figure 21:
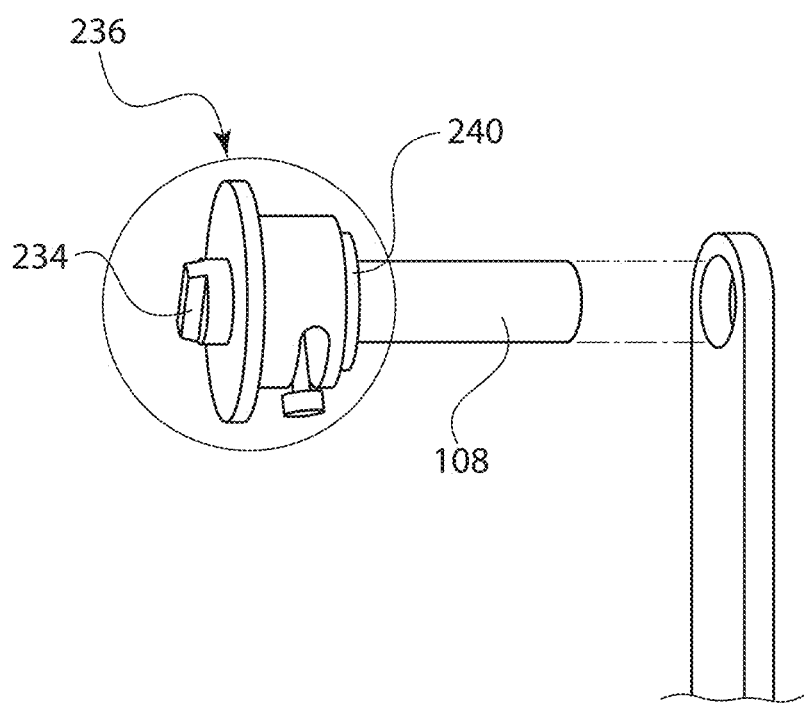
FIG. 21 shows an exploded view of a platen frame with an actuation arm.

Specifically, the rotation actuator 236 also has an actuating arm-side connection 240. This is illustrated by FIG. 21. Rotation actuator 236 rotates when the actuating arm 102 is moved, such that it allows movement of the actuating arm 102 outside the oven to be transferred to the hinged connector 222 via the rotatable element 230, functioning much like a gear. When the actuating arm 102 is raised, the upper platen 14 is also raised. When the actuating arm 102 is lowered, the upper platen 14 is also lowered, due to force of the actuating arm being delivered to the rotation actuator 236 of the oven, which causes force to be delivered to the rotation element 230 of the hinged connector 222.

The frame 220 may be provided with a bracket 242 that is designed to maintain the upper platen 14 in a parallel position with respect to the lower platen 12 when in a pressed position. An upper face 244 of the bracket 242 maintains the upper platen 14 from being forced or buckling upward when the upper platen 14 is pressed against a food item.

The rotation actuator 236 that has an oven-facing side/connection 234 and an actuating arm-side connection 240, in order to receive and transmit force. Because the actuating arm 102 is positioned outside the oven, the arm 102 has an extension portion 108, which can span the distance between the oven cavity 104 and outside the oven housing 200.

The frame 220 on which the platens 12, 14 are mounted is removable from the oven in order to allow the operator to easily remove the press from the oven for cleaning, replacement, or to switch between grooved or flat or open surface platens. Removal of the frame from the oven can entail ensuring that the actuating arm is in a position that causes the oven-side connection 234 to release the groove 232 in the direction of removal travel. To reinstall the frame back into the oven, the frame 220 is slid back into place. It is possible to provide the rotation actuator 236 as a thumbscrew that can be secured into place or removed from the oven cavity 104 and replaced with a cap if the oven will not be used with the panini frame 220. The rotation actuator 236 is designed so that it is not intrusive inside the oven. It is also designed so that it does not leak microwave, such that the operator can remove the rotation actuator without creating a microwave leak.

This manually operated press embodiments disclosed herein have advantages over a door actuated press. For example, a manually operated press provides the operator with more product flexibility. An oven with a door actuated press will only make panini sandwiches. By contrast, an oven with a manually operated press allows the operator to decide whether to press the food item/sandwich in order to make a panini, but also provides the flexibility of not engaging the panini option in order to use the oven for a normal full range of products, such as a toasted sandwich, a pizza, snack items, and so forth. When a panini product is not desired, the operator simply places the product on top of the upper panini plate/platen 14 with the plate in the down position and does not activate the actuating arm 102.

This manual option also allows the operator to apply varying levels of pressure to the food item. If a more pressed sandwich is desired, the operator may apply more pressure to the arm. As described, it is also possible to move the arm via a chain driven step motor, eliminating the need for the operator to manually raise and lower the platens. In this example, the operator could simply select the "panini" option on the control screen 202 and the oven would automatically raise and lower the upper platen 14 (which is the most common embodiment, although the lower platen 12 may be moved instead). The stepper motor driven press can allow the operator to set up a predetermined amount of pressure that is applied to the product during cooking.

In one example, the pressure setting may be a variable setting that can be altered within the cook setting. An exemplary cook setting may define the following parameters: time, air flow percentage, microwave, distance between the platens or any combination thereof. For example, as a cook setting defines "one inch," this means that the upper platen (or lower platen) is moved in order to allow a one inch space to be present between the platens during the cook time.

Various types of platens may be used. One type of platen is a Panini-type platen, which has a solid griddle surface with raised grill portions such that grill marks that can be transferred to the pressed item. Another type is a flat griddle, which can be used for grilling without leaving grill marks. Another type of platen is a griddle has open slots between grill bars, for which the open spaces do not leave a grill mark but for which the grill bars do leave a mark. This type of platen may be useful so that impingement air can aid in toasting the food item and/or so that microwave energy can penetrate through the plate. Another type of platen is a griddle formed of stone, which is designed to withstand and transmit high levels of microwave. This type of griddle may be useful when a food product is to be pressed with a smooth surface while requiring high levels of microwave. (Use of an upper aluminum griddle plate can reduce microwave effectiveness.)

Figure 7:
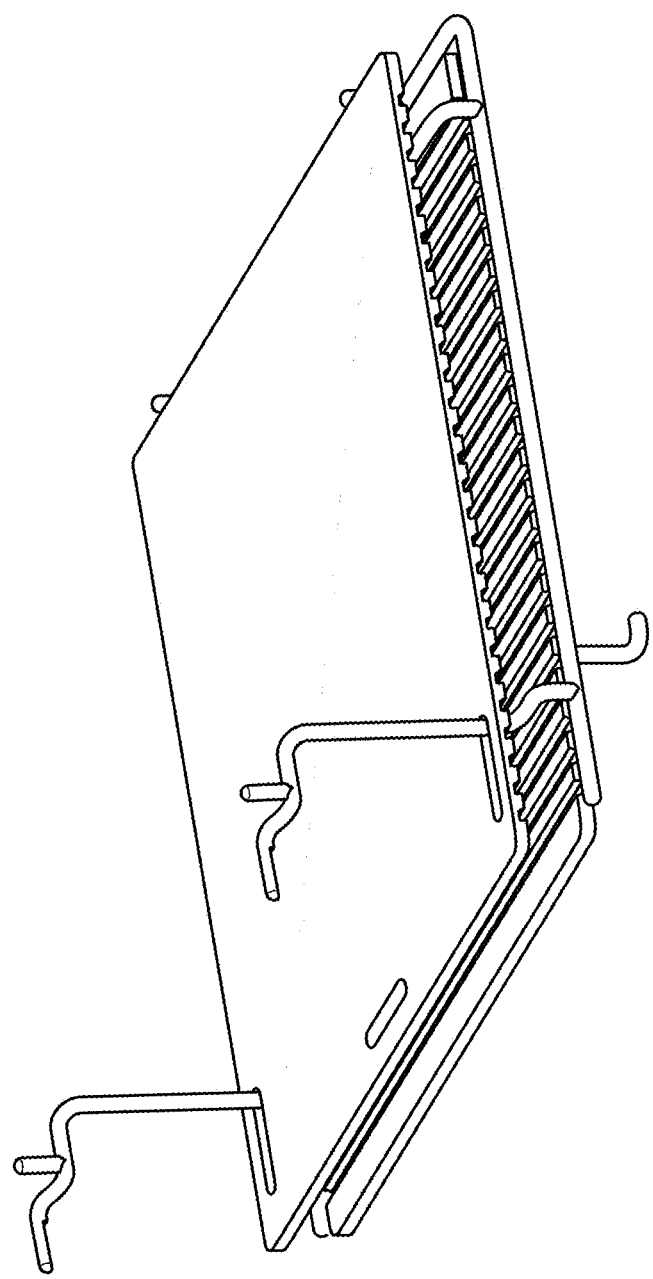
FIG. 7 shows a side perspective view of the oven system of FIG. 3, with the detachable handle removed from the system.

When the platens are in an open position, there is a space formed therebetween. When the system is intended to be used to create a pressed food item, the upper platen 14 is lowered. The lowered position of the upper platen 14 is illustrated by FIGS. 6 and 7, as well as FIGS. 13 and 17 (without a sandwich or other food item positioned between the platens).

It is also possible to raise and lower the upper platen 14 by hand, without the disclosed external handle. For example, once the oven system 10 has been used to heat and press a food item, the platens are likely too hot for manual handling. A user may wear an oven mitt in order to cause movement of the upper platen 14. However, this option may not be desirable in certain instances. Accordingly, in one embodiment, the upper platen 14 has a handle securement interface 56 that cooperates with a detachable handle 58. The handle securement interface 56 may be an opening along or close to an edge 60 of the platen that faces the oven door.

Figure 8:
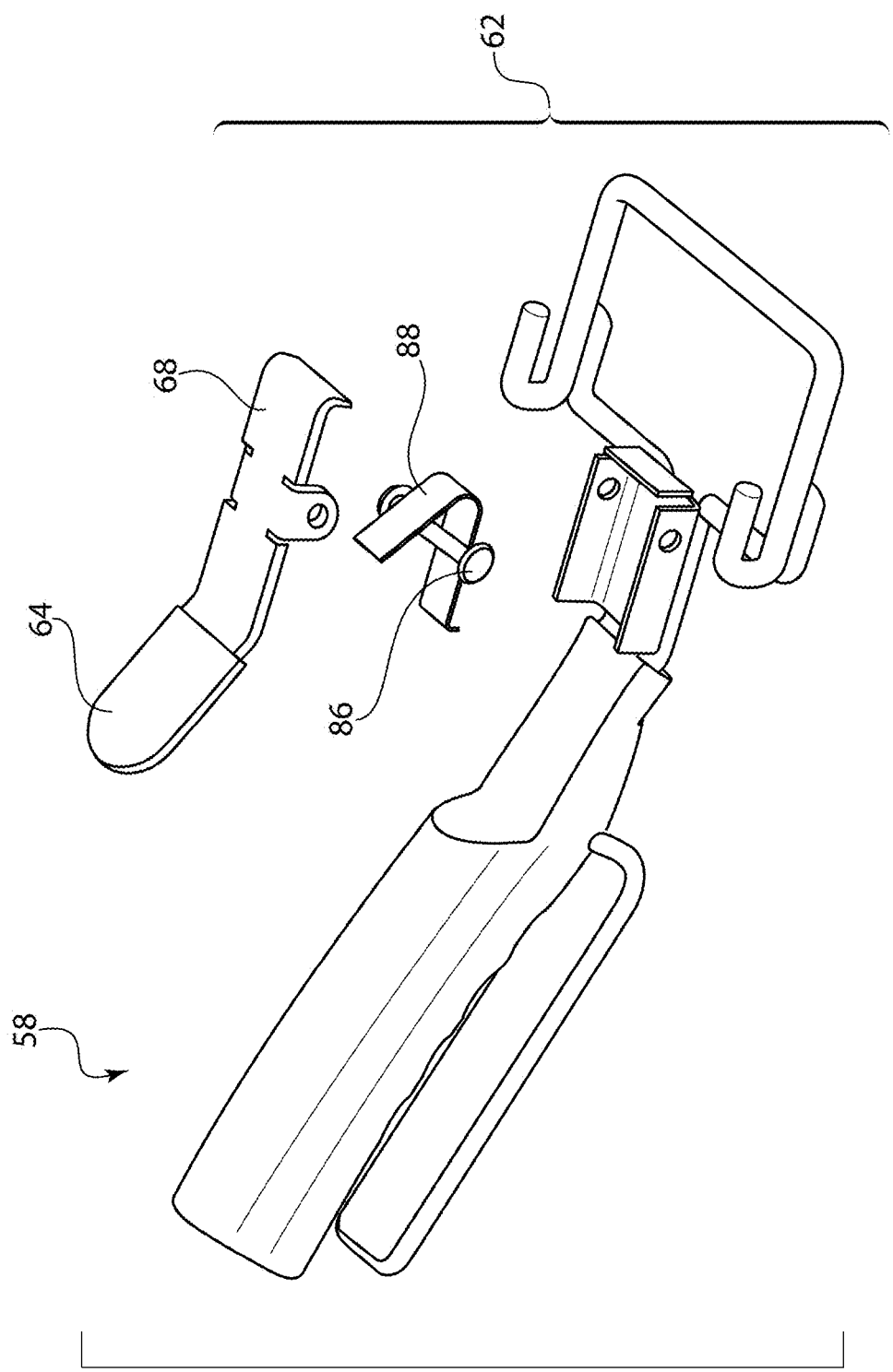
FIG. 8 shows an exploded view of one example of a detachable handle.

One example of a detachable handle 58 is illustrated by FIG. 8. The detachable handle 58 may have openable jaws 62 that are operable via a hinge. Depression of a lever portion 64 may cause the jaws 62 to open. A clamp 68 of the jaws may then engage the handle securement interface 56. (Although the clamp 68 is illustrated as an upper clamp, it should be understood that the clamp 68 may be a lower clamp instead or as well.) Release of the lever portion 64 causes the jaws to close and secure the upper platen 14 with respect to the detachable handle 58. The detachable handle 58 may have a locking pivot feature 86. Pressure on the lever portion 64 opens the jaws 62 and causes engagement of one of the clamp 68 with the plate opening 56. Release of pressure on the lever portion 64 allows a pivoting spring 88 to force the clamp 68 into the closed position. Once engaged, the detachable handle 58 and the upper platen 14 are securely attached. Movement of the detachable handle 58 then causes movement of the upper platen 14. Although one specific example of a detachable handle is described herein, it should be understood that alternate options are possible and considered within the scope of this disclosure.

FIG. 5 illustrates a handle 58 being secured to the upper platen 14. FIG. 6 illustrates the upper platen 14 in its lowered/closed position, with a detachable handle 58 still secured thereto. In order to move between the position of FIG. 5 and the position of FIG. 6 (i.e., once the food product is loaded between the platens), the upper platen 14 is lifted by the operator by (in some instances, by engaging the handle 58) and sliding the openings 26, 28 away from the second horizontal element 42 of the platform support 36. The operator then tilts the upper platen slightly upward and forward over the stop post 40. Once the openings 26, 28 of the upper platen 14 are released from the platform support, the platen 14 may slide down the elongated portion 46 of each vertical support, lowering the upper platen 14 down onto the food product. Once the upper platen 14 is resting on the food product, the operator dis-engages the detachable handle by pressing the thumb lever 64, which opens the clamp 68. The system disclosed is designed to use gravity. The weight of the upper platen during the cook cycle is used to press and compress a sandwich or other food product.

When a sandwich or other food item is placed between the platens 12, 14 and the upper platen 14 is lowered on top of the sandwich by the operator, the two grill plates emulate a traditional Panini press. Because the sandwich is inside of a rapid cook oven or other oven environment, various heat-transfer technologies can be used to thoroughly heat the sandwich. A typical Panini sandwich requires 3-5 minutes in a press. If the oven system described herein is used in a TurboChef rapid cook oven, employment of microwave and high velocity impingement air can heat the sandwich or other food item in 45 seconds to 90 seconds and still provide the visual attributes of a Panini sandwich (pressed and grilled). The center of the sandwich or pressed food item is also fully heated. Because the press is positioned inside an oven, it is also possible to take advantage of the oven's catalytic filtration that destroys and grease, smoke, and/or off odors that can develop during the cooking process, obviating the need for a type 1 hood.

When the cook cycle is completed, the operator opens the oven door and re-engages the detachable handle 58 into the front slot 56 of the upper platen 14 by pressing the thumb lever 64 and engaging the clamp 68 with the opening 56 of the upper platen 14. The operator then moves the upper platen from its closed position to its open position. To move the upper platen 14 back to the open position, the upper platen is lifted vertically to the horizontal resting section (platform support 36) at the top of the vertical supports 22, 24. When the upper platen 14 reaches the top, the platen is pulled backwards and tilted slightly upwards so that the side openings 26, 28 fit over the post 40 on the platform support 36 of the vertical supports and can lock into the open position.

The finished food product is then removed from the oven. At this point, the operator can load another food product into the food press system 10 and repeat as described above to make another product, or lower the upper platen 14 from the open position to the closed position to cook a non-pressed product or simply close the oven door for the oven to remain in ready mode until the next pressed or non-pressed food item is to be cooked.

FIG. 7 illustrates the system positioned in the oven, with the upper platen 14 in a closed position. In this position, the upper platen 14 has been disengaged from the platform support 36 and is allowed to slide down the vertical supports 22, 24. If a food item to be pressed is present, the upper platen 14 contacts the food item (rather than the lower platen 12 as shown).

Some benefits of the oven system 10 described are that it is semi-automatic; there is not a complicated mechanical mechanism to fail. The plates are positioned within the oven cavity; they are not related to or operated with opening and closing of the oven door. The platens are easily replaceable. For example if the non-stick coating becomes worn or chipped or if the platens need to be periodically cleaned, they may interchanged with new ones. The system does not require thermal recovery because the platens are contained in a controlled heated environment. The system also allows for normal/non-pressed food item cooking without removing any internal structure or components. Providing the option of smooth and ribbed platens allows the operator to configure the oven for pressed, but non-grilled marked food items. The detachable/locking handle 58 easily engages and dis-engages from the upper platen, thus providing a safe and positive way to move the platen.

The platens can remain inside the oven cavity 16 and need only be activated when a panini-press type food product is desired. The remainder of the time, the upper platen 14 may remain in the closed position. In other words, when a pressed food item is not required, the upper platen 14 can be lowered and allowed to sit directly above the lower platen 12. If the top-side of the upper platen 14 is not ribbed or otherwise a flat surface, regular (non-panini) items may be cooked inside the oven. While the system is in the closed position, the oven can be used for all rapid cook cooking/heating applications as if there were no food pressing system 10 in the oven because the height of the upper plate is the same as the current base of the oven, and the vertical supports on the sides of the oven cavity do not obstruct loading and unloading of products in and out of the oven cavity. It is also possible to remove the upper platen 14 entirely. It is further possible to remove the entire frame completely. The oven system 10 described thus converts an oven from a standard rapid cook oven to a "panini oven" and then back to a standard rapid cook oven (whether with or without the system remaining in place in the oven), making it a convertible and semi-automated appliance.

The material of the platens is desirably conductive and has a high specific heat. In a specific example, the platens may be aluminum plates. It is possible for the platens to be made of any material currently used in panini press machines or any future materials that may be developed.

In alternate platen designs, the vertical supports 22, 24 of the vertical support system 20 may be integrally formed with the lower platen 12. For example, a lower portion of the vertical supports may be welded to the lower platen. In another example, the vertical support system 20 may cooperate with both the lower platen 12 and the upper platen 14. Both platens 12, 14 may have side openings 26, 28 for cooperating with the vertical supports 22, 24. In this way, both the lower and upper platens 12, 14 are allowed to move with respect to the support system 20. It should also be understood that more than two vertical supports may be used in system described (e.g., two front support rods and two rear support rods).

In a further example, the lower platen 12 may be secured directly to a lower rack or other structure of the cooking cavity 16. The lower platen 12 itself may have one or more side cooks or clips that allow it to be secured to a lower rack, such as a jet plate. The vertical supports 22, 24 need not cooperate with the lower platen 12 in this embodiment. They may be separately installed in the oven cavity. They may be positioned with respect to a frame 80 that does not support the lower platen 12. The lower platen may have a larger or small area than the upper platen 14.

Changes and modifications, additions and deletions may be made to the structures and methods recited above and shown in the drawings without departing from the scope or spirit of the disclosure or the following claims.

What is claimed is:

1. An oven system for pressed food items, comprising:
an oven housing comprising a cooking cavity;
a frame supporting a first platen and a second platen, the frame removable from and positionable within the cooking cavity,
the first and second platens mounted to the frame via at least one hinged connector, the second platen configured to move with respect to the first platen via pivotal movement of the at least one hinged connector,
at least one end of the at least one hinged connector comprising a rotatable element,
an actuating arm comprising a handle shaft and a rotation actuator,
the rotation actuator comprising an oven-side connection that is configured to receive the rotatable element of the at least one hinged connector,
wherein the frame is positioned within the cooking cavity by sliding the frame into the cooking cavity such that the oven-side connection of the rotation actuator of the actuating arm engages with the rotatable element of the at least one hinged connector, connecting the frame with the actuating arm,
wherein the frame is removed from the cooking cavity by sliding the frame out of the cooking cavity, causing the oven-side connection and rotatable element to disengage,
wherein the handle shaft of the actuating arm is mounted to the oven housing such that it extends outside the cooking cavity,
wherein manual activation of the actuating arm from outside the cooking cavity causes rotation of the oven-side connection of the rotation actuator, such that engagement between the oven-side connection and the rotatable element; causes pivoting of the at least one hinged connector, and movement of the second platen.

2. The oven system of claim 1, wherein the actuation system comprises a linkage connecting the first platen and the second platen.

3. The oven system of claim 1, wherein the actuation system comprises hinged connectors connecting the first platen and the second platen.

4. The oven system of claim 1, wherein the oven-side connection of the rotation actuator comprises an elongated protrusion, wherein the rotatable element of the frame comprises a groove, and wherein mating between the elongated protrusion and the groove both secures the frame within the oven cavity and provides cooperation between the actuating arm and the upper platen.

5. The oven system of claim 1, wherein the actuating arm comprises an extension portion that extends the handle outside the oven cooking cavity.

6. The oven system of claim 1, wherein the cooking cavity comprises delivery of forced hot air and a microwave system.

7. The oven system of claim 1, wherein the first platen and second platen each have a first surface and a second surface, where the first surface and the second surface may be any combination between a flat surface, a ribbed surface, a slotted surface, or a stone surface, with the first surface having the same surface pattern as the second surface or a different surface pattern.

8. The oven system of claim 1, wherein the oven housing comprises a support with an internal channel for securing the actuating arm in place on a side of the oven housing.

9. The oven system of claim 1, further comprising a bracket securing the upper platen in place with respect to the frame.

10. The oven system of claim 1, wherein the at least one hinged connector comprises first and second hinged connectors.

11. The oven system of claim 1, wherein the rotatable element comprises a groove along its length, wherein the oven-side connection comprises a protrusion slidingly received by the groove in order to secure the frame within the oven cooking cavity.

12. The oven system of claim 1, further comprising an actuating arm support mounted on an external surface of the oven system, the actuating arm support comprising a channel that receives the actuating arm.

* * * * *